(12) United States Patent
Tsai et al.

(10) Patent No.: US 10,761,212 B2
(45) Date of Patent: Sep. 1, 2020

(54) USER INTERFACE CONFIGURATIONS FOR DATA TRANSFERS

(71) Applicant: PAYPAL, INC., San Jose, CA (US)

(72) Inventors: John Tsai, San Francisco, CA (US); Sumeet Ahuja, Milpitas, CA (US)

(73) Assignee: PAYPAL, INC., San Jose, CA (US)

( * ) Notice: Subject to any disclaimer, the term of this patent is extended or adjusted under 35 U.S.C. 154(b) by 810 days.

(21) Appl. No.: 14/929,114

(22) Filed: Oct. 30, 2015

(65) Prior Publication Data

US 2017/0123633 A1 May 4, 2017

(51) Int. Cl.
*G06F 3/0481* (2013.01)
*G01S 19/01* (2010.01)
*H04W 4/02* (2018.01)
*G01S 19/14* (2010.01)

(52) U.S. Cl.
CPC ............. *G01S 19/01* (2013.01); *G01S 19/14* (2013.01); *G06F 3/0481* (2013.01); *H04W 4/023* (2013.01)

(58) Field of Classification Search
CPC .. G06F 3/0484; G06F 3/04842; G06F 3/0481; G06F 3/0488; H04W 4/023; H04M 1/72583; G01S 19/01; G01S 19/14
See application file for complete search history.

(56) References Cited

U.S. PATENT DOCUMENTS

| | | | | | |
|---|---|---|---|---|---|
| 8,276,810 | B2 * | 10/2012 | Cole | ...................... | G06Q 20/10 235/379 |
| 2001/0032177 | A1 * | 10/2001 | Starkman | ............... | G06Q 40/02 705/38 |
| 2001/0051920 | A1 * | 12/2001 | Joao | ..................... | G06Q 20/105 705/41 |
| 2004/0181540 | A1 * | 9/2004 | Jung | ..................... | G06Q 10/107 |
| 2005/0165715 | A1 * | 7/2005 | Farnham | ................ | G06Q 10/10 |
| 2006/0042483 | A1 * | 3/2006 | Work | ..................... | G06Q 10/00 101/91 |
| 2008/0207327 | A1 * | 8/2008 | Van Luchene | .......... | A63F 13/12 463/42 |
| 2009/0119212 | A1 * | 5/2009 | Liu | ........................ | G06Q 20/10 705/44 |
| 2009/0210340 | A1 * | 8/2009 | Mittal | .................... | G06Q 40/02 705/38 |
| 2010/0180211 | A1 * | 7/2010 | Boyd | ..................... | G06Q 10/10 715/751 |
| 2010/0257454 | A1 * | 10/2010 | Lee | ........................ | G06Q 30/02 715/738 |
| 2010/0274815 | A1 * | 10/2010 | Vanasco | ............ | G06F 17/30867 707/798 |

(Continued)

*Primary Examiner* — Amy Ng
*Assistant Examiner* — William Wong
(74) *Attorney, Agent, or Firm* — Haynes and Boone, LLP

(57) ABSTRACT

Various systems, mediums, and methods herein describe mechanisms that enable client devices to transfer data between various sources and/or requesters. A smartphone system may receive one or more touch inputs from a graphical user interface. The smartphone system may determine a quantity requested and an identifier of the one or more requesters of the quantity. The smartphone system may determine one or more sources able to provide the requested quantity based on the identifier, where each source may be able to provide at least a portion of the quantity requested. The smartphone system may generate an indication of the one or more sources to display the indication on the graphical user interface.

22 Claims, 14 Drawing Sheets

(56) References Cited

U.S. PATENT DOCUMENTS

| | | | |
|---|---|---|---|
| 2011/0112957 A1* | 5/2011 | Ingram | G06Q 40/025 705/38 |
| 2011/0282794 A1* | 11/2011 | Hill | G06Q 20/40 705/80 |
| 2012/0054691 A1* | 3/2012 | Nurmi | G06Q 10/10 715/854 |
| 2012/0158935 A1* | 6/2012 | Kishimoto | G06Q 10/10 709/223 |
| 2013/0031009 A1* | 1/2013 | Kapoor | G06Q 30/06 705/77 |
| 2013/0117174 A1* | 5/2013 | Cole | G06Q 40/02 705/39 |
| 2014/0280941 A1* | 9/2014 | Maguire | H04L 67/10 709/225 |
| 2015/0310470 A1* | 10/2015 | Mathew | G06Q 20/10 705/14.17 |
| 2015/0339638 A1* | 11/2015 | DeLuca | G06Q 20/3224 705/39 |
| 2016/0005033 A1* | 1/2016 | Flick von Zitzewitz | G06Q 40/04 705/39 |
| 2016/0078417 A1* | 3/2016 | DeLuca | G06Q 20/1085 701/23 |

\* cited by examiner

USER INTERFACE CONFIGURATIONS FOR DATA TRANSFERS

TECHNICAL FIELD

This disclosure generally relates to mobile technologies and data infrastructures, and more particularly, various electronic communication systems configured to transfer data.

BACKGROUND

Transferring data has become one of the more essential tasks performed with mobile devices. A broad range of technology facilitates the transfer of the data, including the capabilities of the mobile device and also technical aspects of the data infrastructure. For example, consider a scenario where a user wishes to use a smartphone to receive funds from an electronic data transfer. In this scenario, consider how quickly the user may become unsatisfied if it takes more than a few seconds to operate her smartphone and receive the funds into her account. As a general matter, users may be unsatisfied if the wait time exceeds a mere five seconds to complete the data transfer process and receive a confirmation that the funds have been received.

In further circumstances, consider another scenario where a user needs funds in the form of cash, possibly where the user may have forgotten her cash at home. As such, the user may attempt to locate an automated teller machine (ATM) using her smartphone, find the closest path from her location to the ATM location, and rely on the ATM to be operational such that the user may receive funds appropriately. Yet, even after taking these steps to retrieve cash, the user may have difficulties finding the ATM. Further, even after locating the ATM, the machine may be out of cash or it may be inoperable due to technical difficulties, possibly based on the ATM having network connectivity problems, among other possible issues related to the data infrastructure (e.g., bottlenecks, server maintenance, etc.). As such, there may be several challenges to getting the funds with respect to many external factors and circumstances.

As demonstrated in the scenarios above, there is much need for technological advancements in various aspects of mobile technology and the data infrastructure to resolve many challenges associated with transferring data for receiving and/or sending funds.

Figure 1:
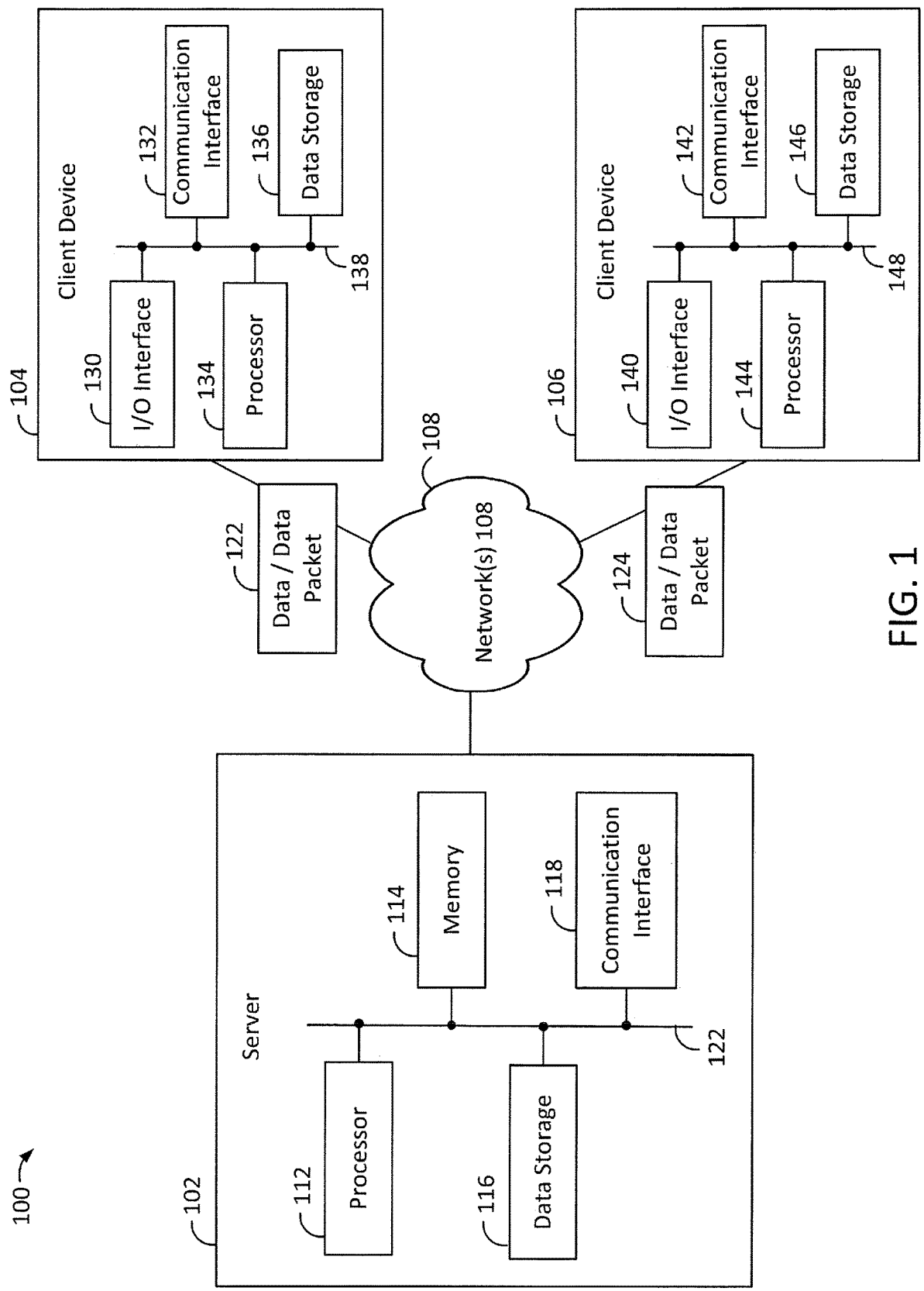
FIG. 1 is a block diagram of an exemplary system, according to an embodiment.

Embodiments of the present disclosure and their advantages may be understood by referring to the detailed description herein. It should be appreciated that reference numerals may be used to illustrate various elements provided in the figures. Further, the figures may illustrate various examples for purposes of illustration and explanation related to the embodiments of the present disclosure and not for purposes of limitation.

DETAILED DESCRIPTION

As described in the scenarios above, there may be various circumstances where a user may wish to transfer data, possibly to send and/or receive funds. Example embodiments herein describe various aspects of mobile technology and the data infrastructure to transfer data reliably and efficiently.

In practice, consider a scenario where a user is in need of cash to make a purchase (e.g., buy lunch at a restaurant), possibly where the user has forgotten her wallet at home. The user, possibly also referred to as a "requester," may simply create a request with her smartphone for a given quantity or an amount of funds. The request may be transmitted to a service provider, such as PAYPAL™, Inc. of San Jose, Calif., USA. The service provider may determine a list of possible sources (e.g., other users) that may be willing to provide the quantity (or a portion of the quantity) to the requester. In some instances, the service provider may identify the sources based on their respective locations so that the funds may be quickly transferred to the requester. For example, the service provider may identify a source already located proximate to the restaurant where the requester wishes to purchase her lunch (e.g., possibly an individual already waiting in line at the restaurant to get his food). As such, the source may receive the request, accept various terms of the request, and give the requester cash to purchase her food. Further, the requester may use her smartphone to repay the source by sending a return amount to the source's account.

Considering the scenarios above, the list of possible sources may be determined based on the request created by the user. For example, the service provider may generate the list of possible sources based on the quantity requested by the user. In particular, the sources may be identified based on a range of the quantity requested (e.g., $5-$20). The sources may also be identified based on prior requests that the sources have accepted or declined in the past. For example, considering the scenarios above, the source that accepted the user's request may have accepted requests for similar quantities in the past. As such, there may be some sources that accept requests for higher quantities (e.g., $100-$1,000) as well, among other ranges of quantities.

In some embodiments, the list of possible sources may be viewed on a map such that the requester's smartphone may display the map and select the source that she wishes to provide the quantity requested. For example, considering the scenarios above, the requester may enter geographic coordinates (e.g., global positioning system (GPS) coordinates) associated with a transfer of the quantity requested. For example, referring back to the scenarios described above, the requester may indicate an address (e.g., an address of the restaurant) where she needs to receive the cash and the smartphone may display the possible sources around that address that may be willing to provide the quantity requested. Yet further, the smartphone may display the possible sources within a threshold distance from the address, among other possibilities.

In some embodiments, the list of possible sources may be determined based on a time period set by the requester to receive the quantity requested. For example, the request for the quantity may indicate a given time period, e.g., 10 minutes, in which the requester must receive the quantity. For example, considering the scenarios above, the requester may indicate a shorter time period, e.g., 5 minutes, to receive the quantity to buy her lunch. As such, the list of possible sources may be determined based on the availability of the sources with that time period. In particular, the list of possible sources may be modified to include sources that may be able to transfer the quantity requested within the time period.

In some embodiments, a return quantity may be determined that the requester may be required to provide to the source in return for a transfer of the quantity requested. In some embodiments, the return quantity may be determined using a given percentage of quantity requested in addition to repaying the quantity requested. Further considering the scenarios above, the return quantity may include an additional twenty percent (e.g., $4) of the quantity requested (e.g., $20), amounting to $24. In some instances, the return quantity may be determined based on details of the request created. For example, the requester may specify the return quantity based on her demand for the quantity indicated in the request under the circumstances. In particular, the requester may specify a higher return quantity (e.g., $30) based on a high demand for the quantity requested and additional demands for the required location and time of the transfer, as described above.

In some embodiments, the return quantity may be determined by the sources. For example, some sources may indicate a return quantity required in return for a transfer of the quantity requested. Further, the source may specify the return quantity based on various difficulties to transfer the quantity under the circumstances. In some instances, the source may specify the return quantity based on the location of the transfer requested. Further, the source may specify the return quantity based on the time period set by the requester to receive the funds. In such instances, the source may increase the return quantity, possibly where the source has to walk a few blocks to transfer the quantity requested or if the source has a short time period (e.g., 5 minutes) to transfer the quantity requested.

In some embodiments, a user, possibly also referred to as a "source," may communicate with the service provider to create an offer to provide a given quantity. As such, the service provider may determine one or more requesters possibly interested in receiving the quantity. Further, a profile structure of the one or more requesters may be determined from the identification of the one or more requesters. In particular, the profile structure may illustrate common connections between the source and the requesters, possibly over one or more networks (e.g., personal networks, professional networks, and/or social networks). As such, the source may view the profile structure on a computing device, such as the source's smartphone, and select a given requester from the one or more requesters, and the quantity may be transferred to the given requester accordingly.

In some embodiments, the profile structure may also indicate a number prior quantities requested by the requesters identified. Further, the profile structure may indicate a number of prior quantities returned by the requesters within respective time periods associated with the prior quantities requested. As such, the source may select a given requester that has a high number of prior quantities requested and a substantially equal number of prior quantities returned within respective required time periods. Thus, the source may select the given requester based on favorable data provided by the profile structure. Further, the profile structure of the one or more requesters may include a risk structure based on a probability that the return quantity is provided to the source in return for the transfer of the requested quantity to the one or more requesters.

The example embodiments described herein may resolve challenges to transferring data over the data infrastructure, including various computer networks. As such, some embodiments may solve problems that did not exist before the availability of the computer networks and/or the Internet. In particular, such embodiments may solve problems specific to transferring data over computer networks. Various such embodiments may also include solutions that are technical nature and/or rooted in data transfer mechanisms of the data infrastructure. Further, such embodiments may provide unconventional steps confined to one or more particular useful applications related to transferring data over the data infrastructure.

In some embodiments, a server system may operate as part of the data infrastructure and one or more networks. The server system may be configured to perform operations in relation to a service provider or payment provider, such as PAYPAL™, Inc. of San Jose, Calif. USA.

FIG. 1 is a block diagram of an exemplary system 100, according to an embodiment. The system 100 may be configured to transfer data over one or more networks 108 of the system 100. In particular, the server 102, the client device 104, and/or the client device 106 may each be configured to communicate over the communication network 108. As shown, the system 100 includes multiple computing devices but may also include other possible computing devices. The server 102 may be configured to receive requests for quantities and determine sources able to provide the quantities. The system 100 may operate with more or less than the computing devices shown in FIG. 1, where each device may be configured to communicate over one or more communication networks 108, possibly to transfer data accordingly. In some instances, the one or more communication networks 108 may include a data network and a cellular network, among other possible networks. In some instances, the communication network 108 may include web servers, network adapters, switches, routers, network nodes, base stations, microcells, and/or various buffers/queues to exchange data/data packets 122 and/or 124.

The server 102 may be configured to perform various operations in relation to the system 100. In some embodiments, the server 102 may be configured to receive a request from a client device, such as client device 104, possibly also referred to as "requester device 104." For example, the request may be a requester for a quantity of funds, objects, computing devices, vehicles, and/or data, among other possible items. The server 102 may determine an identifier of one or more requesters of the quantity, possibly based on connection protocols between the requester device 104 and the server 102. The server 102 may determine one or more sources, including a client device 106, possibly also referred to as "source device 106." The one or more sources may be able to provide the requested quantity, where each source may be able to provide at least a portion of the quantity requested. For example, in some instances, there may be challenges in identifying a single source that is able to provide the requested quantity. As such, the server 102 may transmit an indication of the one or more sources to the requester device 104.

The server 102 may also receive a selection of one or more sources from the requester device 104. Further, the server 102 may send a transmittal to the one or more sources, including the source device 106. The transmittal may include an indication of the quantity requested and an identifier of the one or more requesters of the quantity, including the requester device 104. The server device 102 may communicate with the one or more sources to initiate a transfer of the quantity to the requester device 104. For example, the server 102 may communicate with the one or more sources such that the source device 106 transfers a portion of the quantity requested to the requester device 104. Further, the one or more other sources may transfer the remaining portion of the quantity requested to the requester device 104.

The data/data packets 122 and/or 124, may be transferable via communication protocols such as Transmission Control Protocol/Internet Protocol (TCP/IP). In various embodiments, each of the data/data packets 122 and 124 may be assembled or disassembled into larger or smaller packets of varying sizes, such as sizes from 1,000 to 1,500 bytes, for example, among other possible data sizes. As such, data/data packets 122 and/or 124 may be transferable over the network 108 and to various locations in the data infrastructure in the system 100.

In some embodiments, the server 102 may take a variety of forms. The server 102 may be an enterprise server, possibly operable with one or more operating systems to facilitate the scalability of the system 100, possibly also referred to as the data infrastructure 100. For example, the server 102 may operate with a Unix-based operating system configured to integrate with a growing number of other servers, client devices, and/or networks over various system architectures. The server 102 may further facilitate the workloads associated with numerous data transfers and workloads in view of increasing requesters and sources in the data infrastructure system 100. In particular, the server 102 may facilitate the scalability of such increasing requesters and sources to eliminate data congestion, bottlenecks, and/or transfer delays.

In some embodiments, the server 102 may include multiple components, such as one or more processors 112, memories 114, data storages 116, and/or communication interfaces 118, among other possible components, any of which may be communicatively linked via a system bus, network, or other connection mechanism 122. The processor 112 may take the form of a multi-purpose processor, a microprocessor, a special purpose processor, a digital signal processor (DSP) and/or other types of processing components. For example, processor 112 may include a variable-bit (e.g., 64-bit) processor architecture configured for scalability and to execute varying instructions sets (e.g., simplified and complex instructions sets) with fewer cycles per instruction than other conventional general-purpose processors to improve performance of the server 102.

In some embodiments, the processor 112 may be configured to parse data packets 122 and receive a request from a client device, such as the requester device 104. The processor 112 may determine an identifier of one or more requesters of the quantity, possibly based on connection protocols between the server 102 and the requester device 104. The processor 112 may determine one or more sources, including a source device 106, where each source may be able to provide at least a portion of the quantity requested. As such, the processor 112 may initiate a transmittal to the one or more sources such that at least a portion of the quantity may be transferred to the requester device 104 or the account accessed by the requester device 104.

The processor 112 may further parse the data packets 122 to determine a selection of one or more sources from the requester device 104. In addition, the processor 112 may send a transmittal to the one or more sources, including the source device 106. The transmittal may include an indication of the quantity requested and an identifier of the one or more requesters of the quantity, including the requester device 104. Thus, the processor 112 may initiate a communication with the one or more sources to transfer the quantity to the requester device 104. For example, the processor 112 may communicate with the source device 106 to transfer a portion of the quantity requested to the requester device 104. Further, the one or more other sources may transfer the remaining portion of the quantity requested to the requester device 104.

The memory component 114 and/or the data storage 116 may include one or more volatile, non-volatile, and/or replaceable storage components, such as magnetic, optical, and/or flash storage that may be integrated in whole or in part with the processor 112. Further, the memory component 114 may include or take the form of a non-transitory computer-readable storage medium, having stored thereon computer-readable instructions that, when executed by the processing component 112, cause the server 102 to perform machine learning operations, such as those described in this disclosure and illustrated by the accompanying figures.

The communication interface or component 118 may take a variety of forms and may be configured to allow the server 102 to communicate with one or more devices, such as client devices 104 and/or 106, according to a number of protocols. For example, the communication interface 118 may include a transceiver that enables the server 102 to communicate with the client devices 104 and/or 106 via the one or more communication networks 108. Further, the communication interface 118 may include a wired interface, such as an Ethernet interface, and/or a wireless interface, such as a cellular interface configured to one or more protocols (e.g., GSM, CDMA, UMTS, EV-DO, WIMAX™, or LTE) and/or microcell interface and/or a WI-FI™ interface. The wireless interface may also include interfaces operable to transfer data over short distances utilizing short-wavelength radio waves in approximately the 2.4 to 2.485 GHz range. In some instances, the communication interface 118 may send/receive data or data packets to/from client, devices 104 and/or 106.

The client devices 104 and 106 may also be configured to perform a variety of operations such as those described in this disclosure and illustrated by the accompanying figures. In particular, client devices 104 and 106 may be configured to transfer data/data packets 122 and/or 124 with the server 102, that include requests for quantities encoded in quantity data, location data, GPS coordinate data, beacon data, WI-FI™ data, base station data, triangulation data, peer data, social media data, sensor data, movement data, temperature data, and/or other types of data described herein.

In some embodiments, the client devices 104 and 106 may include or take the form of a smartphone system, a personal computer (PC) (e.g., a laptop device), a wearable computer device, a head-mountable display (HMD) device, tablet computer device, a merchant device, a smart watch device, other types of wearable devices, and/or other types of computing devices configured to transfer data, among other possibilities. The client devices 104 and 106 may include various components, including, for example, input/output (I/O) interfaces 130 and 140, communication interfaces 132 and 142, processors 134 and 144, and data storages 136 and 146, respectively, all of which may be communicatively linked with each other via a system bus, network, or other connection mechanisms 138 and 148, respectively.

The I/O interfaces 130 and 140 may be configured to receive inputs from and provide outputs to one or more users of the client devices 104 and 106. For example, the I/O interface 130 may include a graphical user interface (GUI) configured to receive an input that indicates a request to receive or send one or more quantities. The GUI may also be configured to receive an input that indicates a quantity able to be transferred. Thus, the I/O interfaces 130 and 140 may include input hardware with tangible surfaces such as touchscreens with touch sensitive sensors and/or proximity sensors. The I/O interfaces 130 and 140 may be synched with a microphone configured to receive voice commands, a computer mouse, a keyboard, and/or other input mechanics from the real world environment. In addition, I/O interfaces 130 and 140 may include output hardware such as touchscreen displays, a sound speaker, other audio output mechanism, a haptic feedback system, and/or other components.

In some embodiments, communication interfaces 132 and 142 may include or take a variety of forms. For example, communication interfaces 132 and 142 may be configured to allow client devices 104 and 106, respectively, to communicate with one or more devices according to a number of protocols. For instance, communication interfaces 132 and 142 may be configured to allow client devices 104 and 106, respectively, to communicate with the server 102 via the communication network 108. The processors 134 and 144 may include a multi-purpose processor, a microprocessor, a special purpose processor, a digital signal processor (DSP), an application specific integrated circuit (ASIC), a programmable system-on-chip (SOC), field-programmable gate array (FPGA), and/or other types of processing components.

The data storages 136 and 146 may include one or more volatile, non-volatile, removable, and/or non-removable storage components, and may be integrated in whole or in part with processors 134 and 144, respectively. Further, data storages 136 and 146 may include or take the form of non-transitory computer-readable mediums, having stored thereon instructions that, when executed by processors 134 and 144, cause the client devices 104 and 106 to perform operations, respectively, such as those described in this disclosure and illustrated by the accompanying figures.

In some embodiments, the communication network 108 may be used to transfer data between the server 102, the client device 104, the client device 106, and/or other computing devices associated with the data infrastructure system 100. The communication network 108 may be a packet-switched network configured to provide digital networking communications and/or exchange data of various forms, content, type, and/or structure. The communication network 108 may include a data network such as a private network, a local area network, and/or a wide area network. Further, the communication network 108 may include a cellular network with one or more base station and/or cellular networks of various sizes.

In some embodiments, the client device 104 may create a request possibly encoded with data/data packet 122 to establish a connection with the server 102. As such, the request may initiate a search of an internet protocol (IP) address of the server 102, that may, for example, take the form of the IP address, "192.168.1.102," for example. In some instances, an intermediate server, e.g., a domain name server (DNS) and/or a web server, possibly in the one or more networks 108 may identify the IP address of the server 102 to establish the connection between the client device 104 and the server 102. As such, the client device 104 may request the server 102 to determine one or more sources that are able to provide a quantity requested.

In some embodiments, the source device 106 may transmit indication of an available quantity with the data/data packet 122. In particular, the source device 106 may request to establish a connection with the server 102. The request may initiate a search with one or more of the intermediate server described above to identify the IP address of the server 102. Based on identifying the IP address of the server 102, the source device 106 may request to establish the connection with the server 102. In some instances, the server 102 may request various forms of data such as the location data of the source device 106. Based on receiving the location data (e.g., GPS coordinates of the client device 106), for example, the server 102 may transmit an identifier of one or more requesters of the available quantity.

In some embodiments, the server 102 may include a non-transitory computer-readable medium, possibly integrated with the memory 114. The non-transitory computer-readable medium may include instructions that, when executed by one or more of the processors 112, cause the server 102 to perform operations to receive a request for a quantity by the client device 104. Further, the server 102 may determine one or more requesters of the quantity based at least on the request received. The server 102 may determine one or more sources able to provide the requested quantity based on the one or more requesters determined. Each source of the one or more sources may be able to provide at least a portion of the quantity requested. The server 102 may send a transmittal to the client device 104 that indicates the one or more sources, possibly to display an indication of the one or more sources on a user interface of the client device.

It can be appreciated that the server 102 and the client devices 104 and 106 illustrated in FIG. 1 may be deployed in other ways. The operations performed and/or the services provided by such client devices 104 and 106 may be combined or separated for a given embodiment and may be performed by a greater number or a fewer number of devices. Further, one or more devices may be operated and/or maintained by the same or different entities. Yet, further each device may be associated with one or more accounts.

In some embodiments, an account, possibly also referred to a user account, may be a compilation of data associated with a given user. Some examples of accounts may include accounts with service providers described above and/or other types of financial, transactional, and/or e-commerce related accounts. Further, accounts may also include social networking accounts, e-mail accounts, smartphone accounts, music playlist accounts, video streaming accounts, among other possibilities. For example, an account for a particular user may include data related to the user, data related to the user's interest, and/or data representing the user. Further, the user may provide various types of data to the account via a user device, e.g., client devices 104 and/or 106.

The user account may be displayed on a client device, possibly through I/O interfaces 130 and/or 140 described above in relation to FIG. 1. Thus, the user account may be displayed on a smartphone system and/or any of the devices described herein to access the account. For example, the user may manage one or more of their accounts on client devices 104 and/or 106. In particular, the client device 104 may be used to generate, view, and/or send one or more requests to transfer funds from one account to another account, such as an account accessible by the client device 106.

In some embodiments, a user may have a single account such as an account with a service or payment provider described above representing the user for multiple other accounts. For example, the single user account may represent the user for other e-mail accounts, social networking accounts, smartphone accounts, as well as websites, applications, and/or other services. For example, a user could opt to use their account as a multi-purpose account for performing various operations, including communicating with numerous requesters and sources.

In some embodiments, a user account may be created by one or more users. For example, one account may be a family account where a number of family members or users may have access to the family account. In some instances, the account may be a corporate account, where employees, staff, worker personnel, and/or contractors, among other individuals may have access to the corporate account. Yet further, it should be noted that a user, as described herein, may be a robot, a robotic system, a computing device, a computing system, and/or another form of technology capable of transferring data and/or funds corresponding to the account. A user may be required to provide a login, a password, a code, an encryption key, authentication data, biometric data, and/or other types of data to access to the account.

Figure 2A:
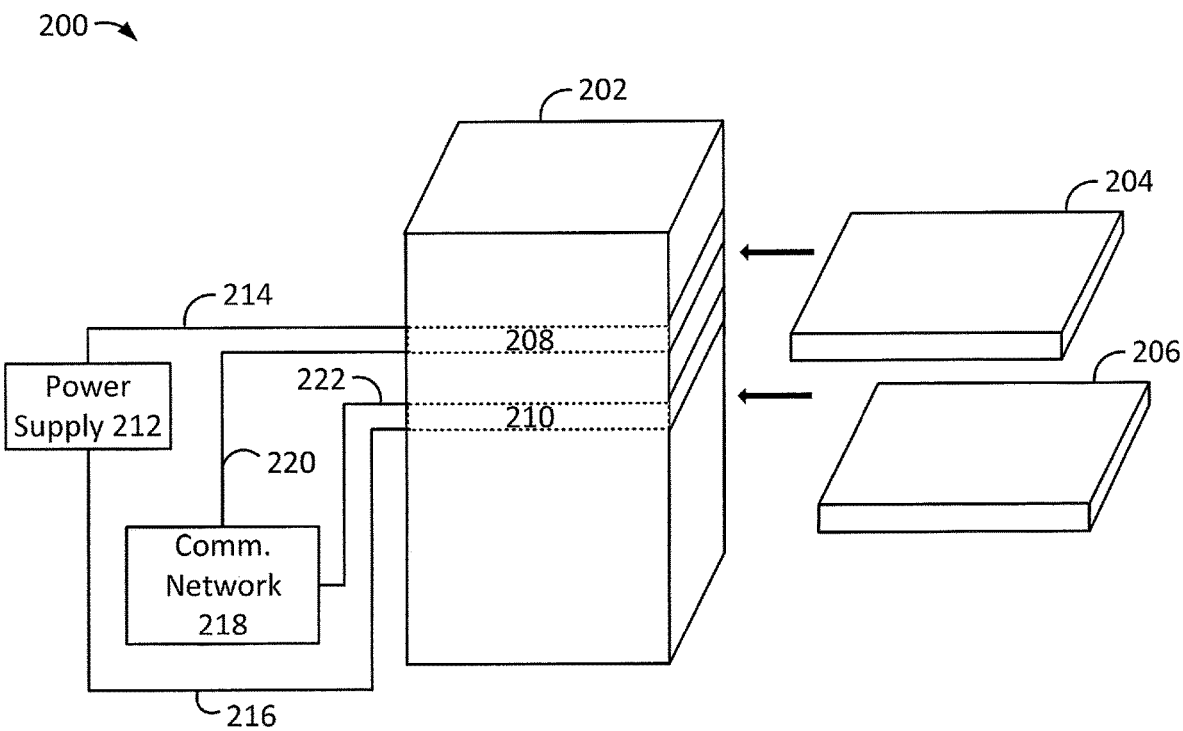
FIG. 2A illustrates an exemplary system configured to support a set of trays, according to an embodiment.

FIG. 2A illustrates exemplary system 200 configured to support a set of trays, according to an embodiment. The system 200 may, for example, include the server 102 described above in relation to FIG. 1. Further, the system 200 may communicate and/or create communication streams with a number of requesters and sources. The system 200 may further support, operate, run, and/or manage the websites in relation to various transfers of funds between accounts.

As shown, system 200 may include a chassis 202 that may support trays 204 and 206 (possibly also referred to as servers or server trays) and multiple other trays as well. The chassis 202 may include slots 208 and 210, among other possible slots, configured to hold or support trays 204 and 206, respectively. For example, the tray 204 may be inserted into the slot 208 and the tray 206 may be inserted into the slot 210. Yet, the slots 208 and 210 may be configured to hold the trays 204 and 206 interchangeably such that the slot 208 may be configured to hold the tray 206 and the slot 210 may be configured to hold the tray 204.

For example, during operation of the system 200, the tray 204 may be inserted into the slot 208 and the tray 206 may be inserted into the slot 210. Further, the trays 204 and 206 may be removed from the slots 208 and 210, respectively. Yet further, the tray 204 may be inserted into the slot 210 and the tray 206 may be inserted into the slot 208, and the system 200 may continue operating. Thus, the design of the trays 204 and 206 may facilitate the reliability and the availability of the system 200 beyond the capabilities of traditional server systems that need to run for longer periods of time without interruptions. As such, the server trays 204 and/or 206 facilitate fault-tolerant capabilities of the server system 200 to further extend time period of operation. In some instances, the server trays 204 and/or 206 may include specialized hardware (e.g., hot-swappable hard drives) that reduce failure rates in order to maximize uptime.

For example, the chassis 202 may be connected to a power supply 212 via connections 214 and 216 to provide power to the slots 208 and 210, respectively. The chassis 202 may also be connected to the communication network 218 via connections 220 and 222 to provide network connectivity to the slots 208 and 210, respectively. As such, trays 204 and 206 may be inserted into slots 208 and 210, respectively, and power supply 212 may supply power to trays 204 and 206 via connections 214 and 216, respectively. Further, trays 204 and 206 may be inserted into the slots 210 and 208, respectively, and power supply 212 may supply power to trays 204 and 206 via connections 216 and 214, respectively.

Yet further, trays 204 and 206 may be inserted into slots 208 and 210, respectively, and communication network 218 may provide network connectivity to trays 204 and 206 via connections 220 and 222, respectively. In addition, trays 204 and 206 may be inserted into slots 210 and 208, respectively, and communication network 218 may provide network connectivity to trays 204 and 206 via connections 222 and 220, respectively.

The communication network 218 may, for example, take the form of one or more of the communication networks 108 described above in relation to FIG. 1, possibly including one or both of a data network and a cellular network. In some embodiments, the communication network 218 may provide a network port, a network hub, a network switch, or a network router that may be connected to an Ethernet link, an optical communication link, a telephone link, among other possibilities.

Figure 2B:
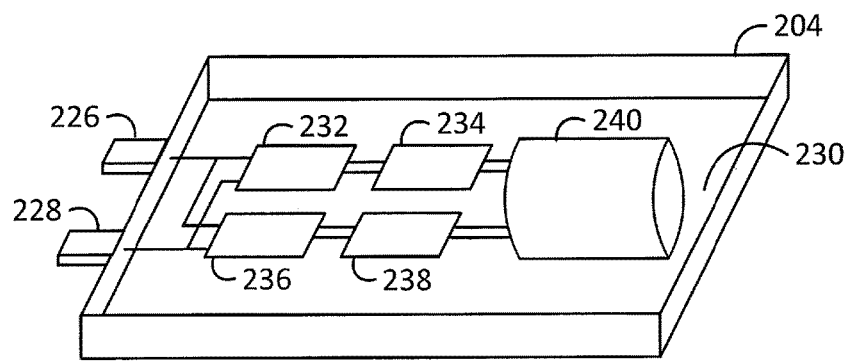
FIG. 2B illustrates an exemplary tray configured to support one or more components, according to an embodiment.

FIG. 2B illustrates an exemplary tray 204 configured to support one or more components, according to an embodiment. The tray 204, possibly also referred to as the server tray 204, may take the form of tray 204 described in relation to FIG. 2A. Further, the tray 206 may also take the form of the tray 204. As shown, the tray 204 may include a tray base 230 as the bottom surface of the tray 204 configured to support multiple components such as a main computing board connecting one or more components 232-240. The tray 204 may include a connection 226 that may link to the connections 214 or 216 to supply power to the tray 204. The tray 204 may also include a connection 228 that may link to the connections 220 or 222 to provide network connectivity to the tray 204. The connections 226 and 228 may be positioned on the tray 204 such that upon inserting the tray 204 into the slot 208, the connections 226 and 228 couple directly with the connections 214 and 220, respectively. Further, upon inserting the tray 204 into the slot 210, the connections 226 and 228 may couple directly with connections 216 and 222, respectively.

In some embodiments, the tray 204 may include the processor component 232, the memory component 234, the data storage component 236, the communication component and/or interface 238, that may, for example, take the form of the processor 112, the memory 114, the data storage 116, and the communication interface 118, respectively. Further, the tray 204 may include the data engine component 240. As such, the connections 226 and 228 may be configured to provide power and network connectivity, respectively, to each of the components 232-240. In some embodiments, one or more of the components 232-240 may perform operations described herein and/or illustrated by the accompanying figures. In some embodiments, the components 232-240 may execute instructions on a non-transitory, computer-readable medium to cause the system 200 to perform such operations.

As shown, the processor component 232 may take the form of a multi-purpose processor, a microprocessor, a special purpose processor, a digital signal processor (DSP). Yet further, the processor component 232 may take the form of an application specific integrated circuit (ASIC), a programmable system on chip (PSOC), field-programmable gate array (FPGA), and/or other types of processing components. For example, the processor component 232 may take the form of a processor component configured to determine an identifier of one or more requesters of a quantity, possibly based on connection protocols between the server tray 204 and a requester device, such as the requester device 104 described. The processor 232 may determine one or more sources, such as the source device 106 described above, where each source may be able to provide at least a portion of the quantity requested. As such, the processor 232 may initiate a transmittal to the one or more sources such that at least a portion of the quantity requested may be transferred to the requester device 104.

In some embodiments, the processor component 232 may take the form of a processor component configured to receive an indication of an available quantity from a source device, such as the source device 106 described above. The processor 232 may identify one or more requesters of the available quantity, where each requester may be interested in at least a portion of the quantity available. As such, the processor 232 may initiate a transmittal to the one or more sources to transmit an identifier of one or more requesters of the available quantity.

In some embodiments, the processor component 232 may be configured with a Unix-based operating system, possibly to support scalability with various other servers and/or data infrastructures. In particular, the processor component 232 may be configured to be scalable with other servers of various forms that may, for example, include server trays, blades, and/or cartridges similar to the server trays 204 and/or 206. In some instances, the processor component 232 may be configured with scalable process architectures, including, reduced instruction set architectures. In some instances, the processor component 232 may be backwards compatible with various legacy systems such that the processor component 232 may receive, read, and/or execute instruction sets with legacy formats and/or structures. As such, the processor component 232 generally has capabilities beyond that of general-purpose processors.

The database engine component 240 may include one or more secure databases to track numerous accounts and funds transferred between accounts. For example, the database engine component 240 may include secured databases to identify a requester account and a source account such that funds may be transferred from the source account to the recipient account accordingly. As such, the database engine component 240 may perform searches based on numerous queries, search multiple databases in parallel, and produce search results simultaneously and/or consecutively. Thus, the database engine component 240 may relieve various bottlenecks possibly encountered with the management of number accounts performed by other conventional servers.

Any two or more of the components 232-240 described above may be combined to take the form of one or more ASICs, SOCs, FPGAs, and/or other types of processing components, among other types of processors. For example, two or more of the processor component 232, the memory component 234, the data storage component 236, the communication component and/or interface 238, and/or the data engine component 240 may be combined. Further, the combined component may take the form of one or more processors, DSPs, SOCs, FPGAs, and/or ASICs, among other types of processing devices and/or components described herein. For example, the combined component may take the form an SOC that integrates various other components in a single chip with digital, analog, and/or mixed-signal functions, all incorporated within the same substrate. As such, the combined component or device may be configured to carry out various operations of the components 232-240.

Components 232-240 described above may provide advantages over conventional or general-purpose servers and/or computers. For example, components 232-240 may enable the system 200 to transfer data efficiently between requesters and sources. In particular, components 232-240 may enable the system 200 to determine quantities requested and sources able to provide the quantities locally from a single server tray 204. Further, the system 200 may be able to determine quantities available and requesters interested in such available quantities locally from the same server tray 204. In some instances, configuring a separate and/or dedicated processing component 232 to pair sources with requesters may optimize operations beyond the capabilities of conventional servers and/or general-purpose processors. As such, the average wait time from the client perspective to identify sources or requesters may be minimized to less than a single second.

It can be appreciated that the system 200, the chassis 202, the trays 204 and 206, the slots 208 and 210, the power supply 212, the communication network 218, and the components 232-240 may be deployed in other ways. The operations performed by components 232-240 may be combined or separated for a given embodiment and may be performed by a greater number or fewer number of components or devices. Further, one or more components or devices may be operated and/or maintained by the same or different entities.

Figure 3A:
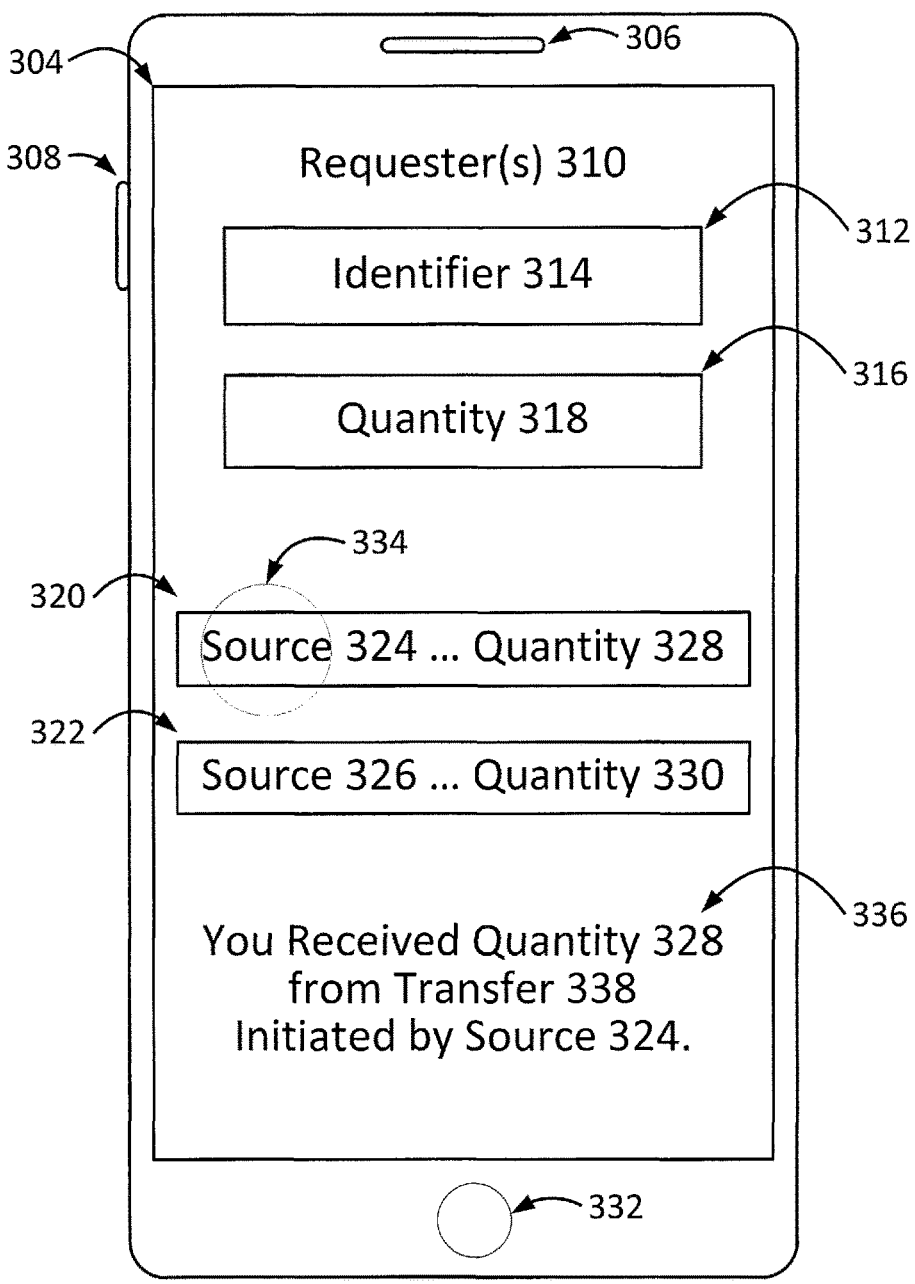
FIG. 3A illustrates an exemplary system with a client device, according to an embodiment.

FIG. 3A illustrates an exemplary system 300 with a client device 302, according to an embodiment. In some embodiments, the system 300 may take the form of the system 100 such that, for example, the client device 302 takes the form of the client device 104. Further, the system 300 may include the system 200 described above in relation to FIGS. 2A-B. Further, the system 300 may include one or more server processor components that may, for example, take the form of the processor components 112 and/or 232.

As shown, the smartphone system 300 may include a graphical user interface 304, a speaker/microphone 306, and a button 308, among other possible hardware components. The smartphone system 300 may also include a non-transitory memory comprising instructions. The smartphone system 300 may also include one or more hardware processors that may take the form of the processor 134. The one or more hardware processors may be coupled to the non-transitory memory and configured to read the instructions to cause the smartphone system 300 to perform operations. In some embodiments, the smartphone system 300 may perform operations to receive one or more touch inputs from the graphical user interface 304. As shown, the graphical user interface 304 may display one or more requesters 310, an identifier 314 of the one or more requesters 310, and a quantity 318.

In some embodiments, the smartphone system 300 may determine the identifier 314 of one or more requesters 310 of the quantity 318. For example, the smartphone system 300 may determine the identifier 314 based on one or more touch inputs received, possibly including inputs received in the editable field 312. The identifier 314 may include, for example, an account identifier, an email address identifier, and/or a phone number identifier of the one or more requesters 310. Notably, the one or more requesters 310 may represent a number of individuals that request the quantity 318. For example, the identifier 314 may include a group account identifier that represents a number of members or users, family members, employees, staff, and/or worker personnel, as described herein. Further, the identifier 314 may be a device identifier (e.g., an IP address of the client device 302 and/or a token identifier based on the client device 302 communicating with other devices).

Further, the smartphone system 300 may determine the quantity 318 based at least on the one or more touch inputs received, possibly including inputs to the editable field 316. As such, the quantity 318 may be a quantity of funds, objects, computing devices, vehicles, data, and/or other objects as described herein. For example, the quantity 318 may be a quantity of funds, such as a quantity of $5-$20. Yet, the quantity 318 may be a quantity of funds of higher value such as a quantity of $100-$1000, among other quantities.

Yet further, the smartphone system 300 may determine one or more sources 324 and 326 able to provide the requested quantity 318 based at least on the identifier 314 of the one or more requesters 310. For example, the smartphone system 300 may determine the one or more sources 324 from a number sources identifiable from data stored in the smartphone system 300 (e.g., the data storage 136). Yet further, the smartphone system 300 may determine the one or more sources 324 and 326 through communication with a server (e.g., the server 102 and/or the server tray 204). In particular, the smartphone system 300 may send the quantity requested 318 and the identifier 314 of the one or more requesters 310 to the server tray 204. In response to the quantity requested 318 and the identifier 314 received, the server tray 204 may search for a number of sources able to provide the quantity requested 318, possibly based on prior quantities provided by the number of sources in the past. As such, the server tray 204 may send data to the smartphone system 300 possibly over one or more networks that indicates the sources 324 and 326.

As such, the smartphone system 300 may determine that each source of the one or more sources 324 and 326 is able to provide at least a portion of the quantity 318 requested. Further, the smartphone system 300 may generate indications 320 and/or 322 of the one or more sources 324 and/or 326, respectively. Thus, the smartphone system 300 may display the indications 320 and/or 322 on the graphical user interface 304. As shown, the smartphone system 300 may determine a first source 324 and a second source 326 possibly from numerous other sources able to provide the requested quantity 318. In particular, the first source 324 may be able to provide a first quantity 328 and the second source 326 may be able to provide a second quantity 330 of the requested quantity 318.

In some embodiments, the one or more hardware processors of the smartphone system 300 may be configured to receive one or more second touch inputs 334 that indicates a selection of the of the one or more sources 324 and/or 326 to provide the requested quantity. In some instances, the graphical user interface 304 may be configured to receive multiple touch inputs, possibly at substantially the same time. For example, the graphical user interface 304 may be configured to receive touch inputs that indicate selections of the sources 324, 326, and/or possibly other sources that may be displayed on the graphical user interface 304. In practice, for instance, the user may touch both the indications 320 and 322 at the same time or substantially simultaneously to select both the sources 324 and 326, respectively. Further, the button 332 may include a fingerprint sensor to detect a fingerprint from one or more of the requesters 310 to authenticate the selected sources 324 and/or 326. For example, the indications 320 and 322 may be simultaneously selected while the fingerprint sensor detects a fingerprint of the requester 310.

Further, the smartphone system 300 may initiate or send a transmittal to the one or more selected sources 324 and/or 326 including the quantity requested 318 and the identifier 314 of the one or more requesters 310 of the quantity 318. In some instances, the smartphone system 300 may initiate the transmittal through communication with the server tray 204. In particular, the smartphone system 300 may send an indication of the selection (e.g., input 334) of the one or more sources 324 and/or 326 to the server tray 204. In response to the indication received, the server tray 204 may send a transmittal to the one or more selected sources 324 and/or 326 including an indication of the quantity 318 requested and the identifier 314 of the one or more requesters 310 of the quantity 318.

Thus, the smartphone system 300 may receive the quantity 318 requested from the one or more selected sources 324 and/or 326 based at least on a transfer 338 of the quantity 328 to the one or more requesters 310. In practice, for example, the transfer 338 may be an electronic transfer of the quantity 318 to the one or more requesters 310. As shown, for instance, the notification 336 provides the transfer 338, possibly to include a transfer number that identifies the transaction of the quantity 318 from a source account of the one or more sources 324 and/or 326 to a requester account of the one or more requesters 310. Yet, in some instances, the transfer 338 may be a physical transfer of the quantity 318 to the one or more requesters 310. For example, considering the scenarios above, transfer 338 may be a physical transfer where the one or more sources 324 and/or 326 walk a few blocks to transfer 338 the quantity 328 to the one or more requesters 310. Yet, in some instances, the transfer 338 may be a combination of the electronic transfer and the physical transfer noted above, among other possibilities. For example, consider that the quantity 318 is a larger quantity (e.g., $1,000). In such instances, the physical transfer may be $300 and the electronic transfer may be $700, possibly to maintain a reasonable value for the physical transfer.

Figure 3B:
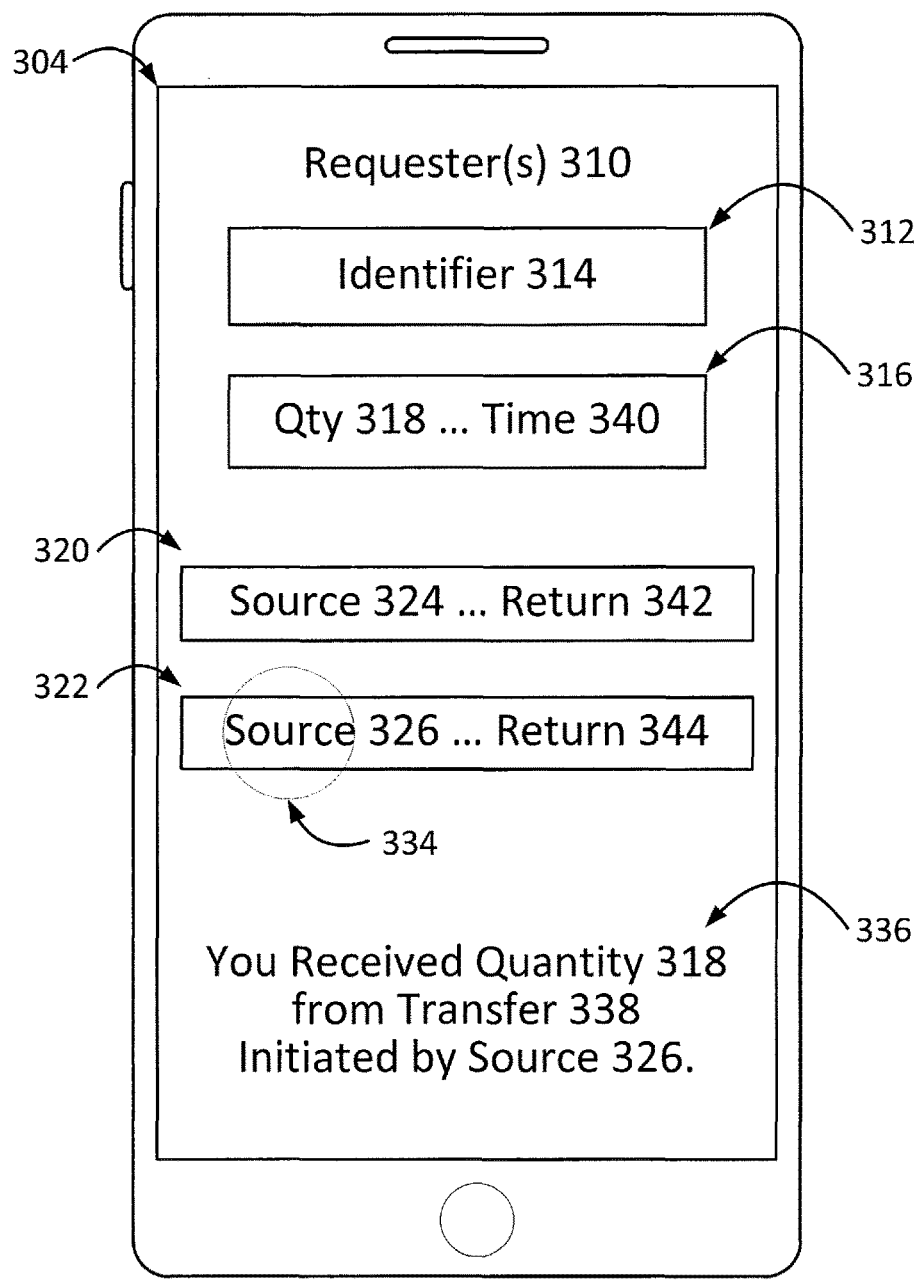
FIG. 3B illustrates an exemplary system with a client device, according to an embodiment.

FIG. 3B illustrates an exemplary system 300 with a client device 302, according to an embodiment. For example, the smartphone system 300 and the client device 302 may take the form of those in FIG. 3A. As shown, the smartphone system 300 may include the graphical user interface 304 that displays the one or more requesters 310, the identifier 314 in the editable field 312, the quantity requested 318 in the editable field 316, the source 324 in the indication 320, and the source 326 in the indication 322.

In some embodiments, the one or more hardware processors of the smartphone system 300 may be configured to determine a time period 340 required and/or set for the one or more requesters 310 to receive the quantity 318. In practice, for example, the requester 310 may indicate the time period 340 in which the requester 310 wishes to receive the quantity 318. As such, the smartphone system 300 may determine the time period 340 possibly based at least on the one or more touch inputs of the requester received by the graphical user interface 304, where the touch inputs specify the time period 340. For example, the requester 310 may simply input, "I need a quantity (318) within the time period (340)," "send quantity (318) by the time (340)," and/or other text strings and/or instructions.

Further, the smartphone system 300 may determine the one or more sources 324 and/or 326 based at least on the time period 340. For example, the smartphone system 300 may identify the one or more sources 324 and/or 326 are available during the time period 340, possibly to transfer the quantity 318. In particular, the smartphone system 300 may communicate with the server tray 204 to determine the one or more sources 324 and/or 326 are online and/or active based on statuses indicated by the one or more sources 324 and/or 326, possibly in one or more networks (e.g., networks 108).

In some embodiments, the one or more hardware processors of the smartphone system 300 may be configured to determine return quantities 342 and/or 344 required by the one or more sources 324 and/or 326 in return for a transfer 338 of the requested quantity 318 to the one or more requesters 310. The smartphone system 300 may determine the return quantities 342 and/or 344 based on various factors, such as the identifier 314 of the one or more requesters 310, the time period 340 set or required by the one or more requesters 310 to receive the quantity, and/or the credit history of the one or more requesters 310, among other possible factors.

Further, the smartphone system 300 may generate the indications 320 and/or 322 of the one or more sources 324 and/or 326 such that the indications 320 and/or 322 include the return quantities 342 and/or 344 required by the one or more sources 324 and/or 326, respectively. For example, the source 324 may require the return quantity 342 based on a transfer of the quantity 328 to the one or more requesters 310. Further, the source 326 may require the return quantity 344 based on a transfer of the quantity 330 to the one or more requesters 310, where the quantity 328 may be different from the quantity 330 and the return quantity 342 may be different from the return quantity 344.

Referring back to FIG. 3A, for example, the indication 320 may provide that the source 324 is able to provide a quantity 328 (e.g., $70) of the quantity 318 requested (e.g., $100). The indication 322 may provide that the source 326 is able to provide a quantity 330 (e.g., $30) of the quantity 318 requested (e.g., $100). Referring to FIG. 3B, the indication 320 may further provide return quantity 342 (e.g., $77) required by the source 324 in return for the transfer of the quantity 328 (e.g., $70), possibly 110% of the quantity 328. Further, the indication 322 may further provide return quantity 344 (e.g., $33) required by the source 326 in return for the transfer of the quantity 330 (e.g., $30), possibly 110% of the quantity 330. Yet, consider another scenario where the source 326 is farther from requester 310 than the source 324. In such instances, the return quantity 344 may be higher (e.g., $50), possibly where the source must deliver the requested quantity 330.

In some embodiments, the one or more hardware processors of the smartphone system 300 may be configured to determine a first return quantity 342 required by the first source 324 and a second return quantity 344 required by the second source 326, possibly among other sources displayed in the graphical user interface 304. In some instances, the first return quantity 324 and the second return quantity 344 are required in return for a transfer (e.g., 338) of the first quantity 328 and the second quantity 330 to the one or more requesters 310. Further, the smartphone system 300 may be configured to generate the indications 320 and/or 322 to include the first return quantity 342 and the second return quantity 344, respectively, and possibly other return quantities required by other sources as well.

Figure 3C:
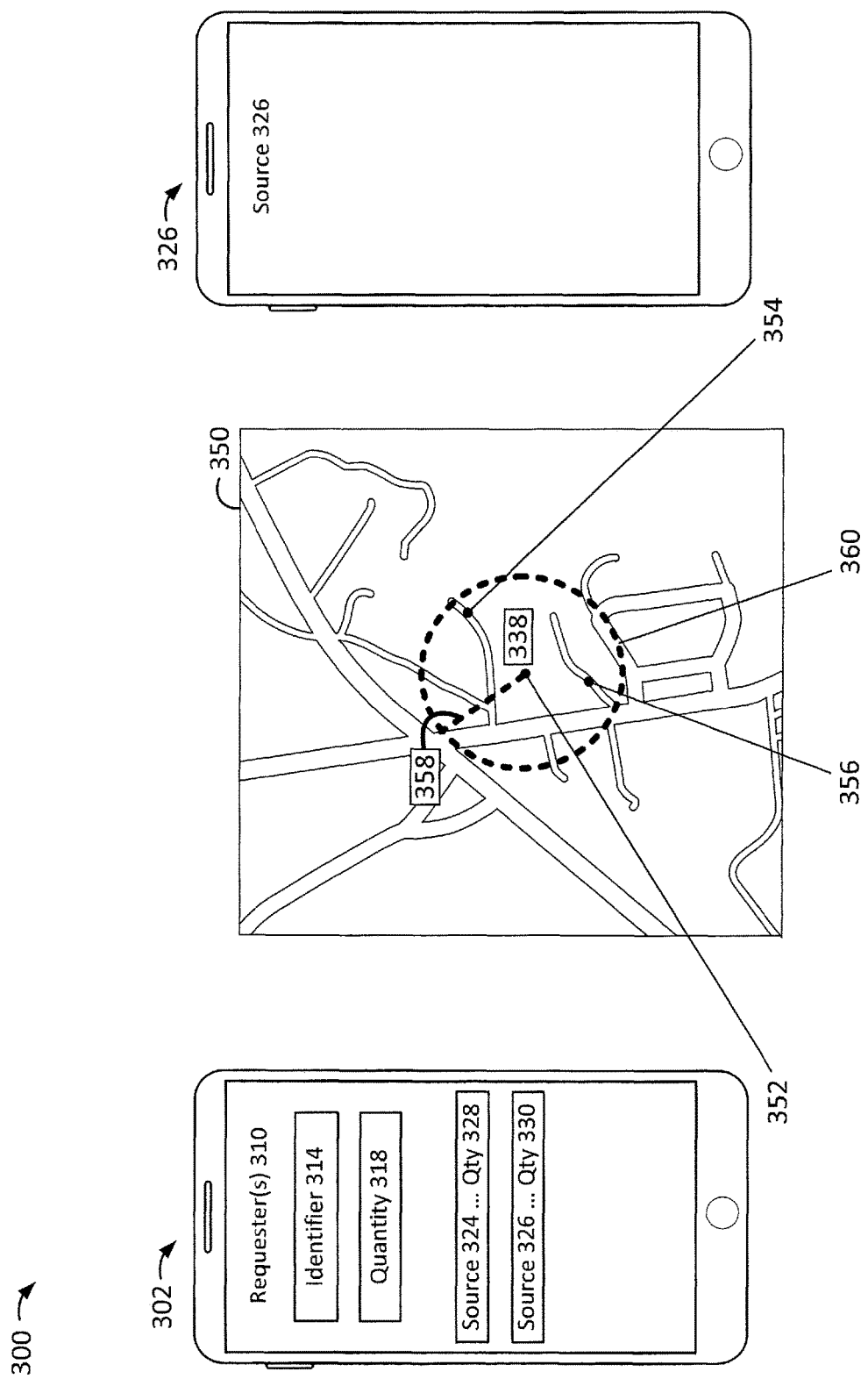
FIG. 3C illustrates an exemplary system with a number of client devices, according to an embodiment.

FIG. 3C illustrates an exemplary system 300 with a number of client devices 302 and 326, according to an embodiment. For example, the smartphone system 300 may include the client device 302, possibly also referred to as the requester device 302. Further, the smartphone system 300 may include the client device 326, possibly also referred to as the source 326 and/or the source device 326. As shown, the requester device 302 may display the one or more requesters 310, the identifier 314, the quantity 318, the source 324, the source 326, and/or the respective quantities 328 and/or 330. Further, the source device 326 may display the source 326, possibly including a username of the source 326.

In addition, the one or more hardware processors of the smartphone system 300 may be configured to determine a location 352 (e.g., global positioning system (GPS) coordinates) of the smartphone system 300 on the geographic map 350, as shown for illustrative purposes. The location 352 may be associated with the transfer 338 of the quantity 318 requested. As shown in this example geographic map 350, the location 352 of the requester device 302 may be the same as the location of the transfer 338. As such, the smartphone system 300 may be configured to determine the source 326 based on the location 354 of the source 326 within a threshold distance 358 from the location 352. Yet further, the smartphone system 300 may determine the source 324 at a location 356 within the threshold distance 358 illustrated by the region 360. As such, referring back to FIG. 3B, indications 320 and/or 322 may be displayed with the sources 324 and/or 326, respectively.

In some instances, smartphone system 300 may determine the locations 352, 354, and/or 356 based on various forms of data, possibly retrieved from the server (e.g., server tray 204). In some instances, for example, the server tray 204 may determine the locations 352, 354, and/or 356 of the requester device 302, the source 326, and/or the source 324, respectively, based on retrieving WI-FI™ beaconing data, Enhanced Observed Time Difference (EOTD) data, global positioning System (UPS) data, Assisted UPS (A-GPS) data, Differential UPS (DGPS) data, Time Difference of Arrival (TDOA) data, Angle of Arrival (AOA) data, triangulation data, local transceiver pilot signal data, among other forms of location data described above. Yet further, in some instances, the location 352, 354, and/or 356 may be further determined by cellular protocol data, including GSM, CDMA, UMTS, EV-DO, WIMAX™, or LTE data, and/or base station data. In addition, the location 352, 354, and/or 356 may be further determined by sensor data, movement data (e.g., acceleration and/or velocity data) of the requester device 302 and/or the source 326, temperature data, radio-frequency identifier (RFID) data, near-field communications (NFC) data, among other possible forms of data.

Notably, the smartphone system 300 may display the geographic map 350 with the indications 320 and 322 of the sources 324 and 326, respectively, as described above in relation to FIGS. 3A-B. As such, the requester may select which of the sources 324, 326, and/or other sources to transfer the quantity 318 based on their respective locations 354 and/or 356 proximate to the region 360 around the location 352. For example, the smartphone system 300 may request the server tray 204 to search and identify one or more sources, such as sources 324 and/or 326, able to provide the quantity 318 requested. As such, the server tray 204 may return both the sources 324 and/or 326, where neither source 324 or 326 separately may be able to provide the quantity 318 in its entirety.

In some instances, the source 324 may provide a first quantity 328 and the source 326 may provide a second quantity 330, where the first quantity 328 and the second quantity 330 together may amount to the quantity 318. In some instances, the one or more requesters 310 may retrieve the first quantity 328 from the source 324 at the location 356 and further retrieve the second quantity 330 from the source 326 at the location 354. Further, the locations 354 and/or 356 may located along a particular route traveled by the requester 310. For example, the locations 354 and/or 356 may be located along a route traveled by the requester 310 to go to a baseball game. As shown, for instance, the requester 310 may be travelling from the location 356 where the first quantity 328 was retrieved and the requester 310 may be travelling to the location 354 to retrieve the second quantity 330 near the baseball stadium, among other possibilities.

Figure 3D:
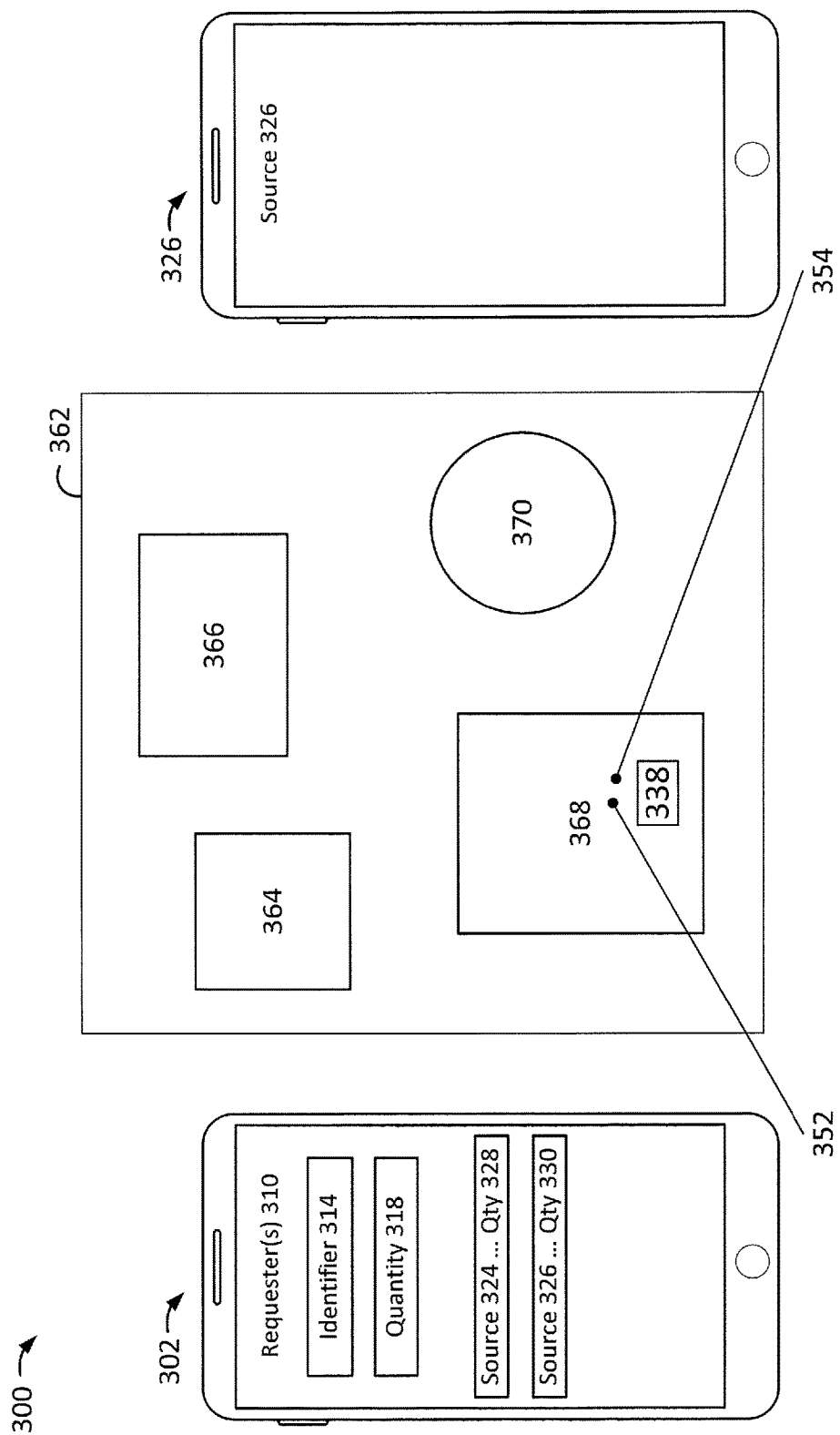
FIG. 3D illustrates an exemplary system with a number of client devices, according to an embodiment.

FIG. 3D illustrates an exemplary system 300 with a number of client devices 302 and 326, according to an embodiment. For example, the smartphone system 300 may include the client device 302, possibly referred to as the requester device 302. As noted, the client device 326 may be referred to as the source 326 and/or the source device 326. As shown, the requester device 302 may display the one or more requesters 310, the identifier 314, the quantity 318, the source 324, the source 326, and/or the respective quantities 328 and/or 330. Further, the source device 326 may display an identifier of the source 326, possibly a username of the source 326.

In addition, one or more hardware processors of the smartphone system 300 may be configured to determine a location 352, e.g., global positioning system (GPS) coordinates, of the smartphone system 300 on the geographic map 362, as shown for illustrative purposes. As shown, the smartphone system 300 may be proximate to various buildings 364, 366, 368, and 370. In some instances, the building 364, 366, 368, and 370 may include merchant buildings, brick-and-mortar buildings, business buildings, and/or other types of buildings where a quantity may be transferred, possibly to make a purchase.

As shown, the location 352 may be the location where the transfer 338 of the quantity 318 is requested. Further, the location 352 of the requester device 302 may be proximate to the location of the transfer 338 identified by the requester device 302, as described above. As such, the smartphone system 300 may be configured to determine the source 326 based on the location 354 of the source 326 within the building 368. Referring to the scenarios above, for example, the building 368 may be a restaurant in which the requester 310 would like to receive the quantity 318 to purchase items in the restaurant. Further, the source 326 may be located in the restaurant building 368. As such, the requester 310 may select the source 326 and the source 326 may transfer 338 the quantity 318 to the requester 352 at the location 352.

Notable, various operations of the smartphone systems 300 may be performed with one or more mobile applications, possibly downloadable by the smartphone systems 300. For example, a mobile application (possibly referred to as a "mobile app" or "app") may be developed and/or downloaded by the smartphone systems 300 based on a set of test and/or live application programming interface (API) data sets. In some embodiments, one or more APIs may include a payload or a set of input fields associated with a request. In some instances, the API operations may have both required and/or optional input fields. For example, the following fields may include one or more parameters in the payload associated with the quantity 318 and/or the one or more requesters 310 described above.

```
USER=<Your_APIIdentifier>&
PWD=<Your_APIPassword>&
METHOD=Transfer&
VERSION=78&
QTY=20&
cancelUrl=http://www.example.com/cancel.html&
returnUrl=http://www.paypal.com/quantity318.html
```

As illustrated, the above fields may include parameters (e.g., minimum parameters) that may be included or possibly required in a payload associated with the quantity 318 requested by the one or more requesters 310. In particular, various parameters may include an identifier shown above as "USER," a password shown above as "PWD," a method of payment shown above as "METHOD" and "Transfer" (e.g., a transfer associated with the transfer 338 described above), and quantity for twenty dollars shown above as "QTY" and "20."

Figure 4A:
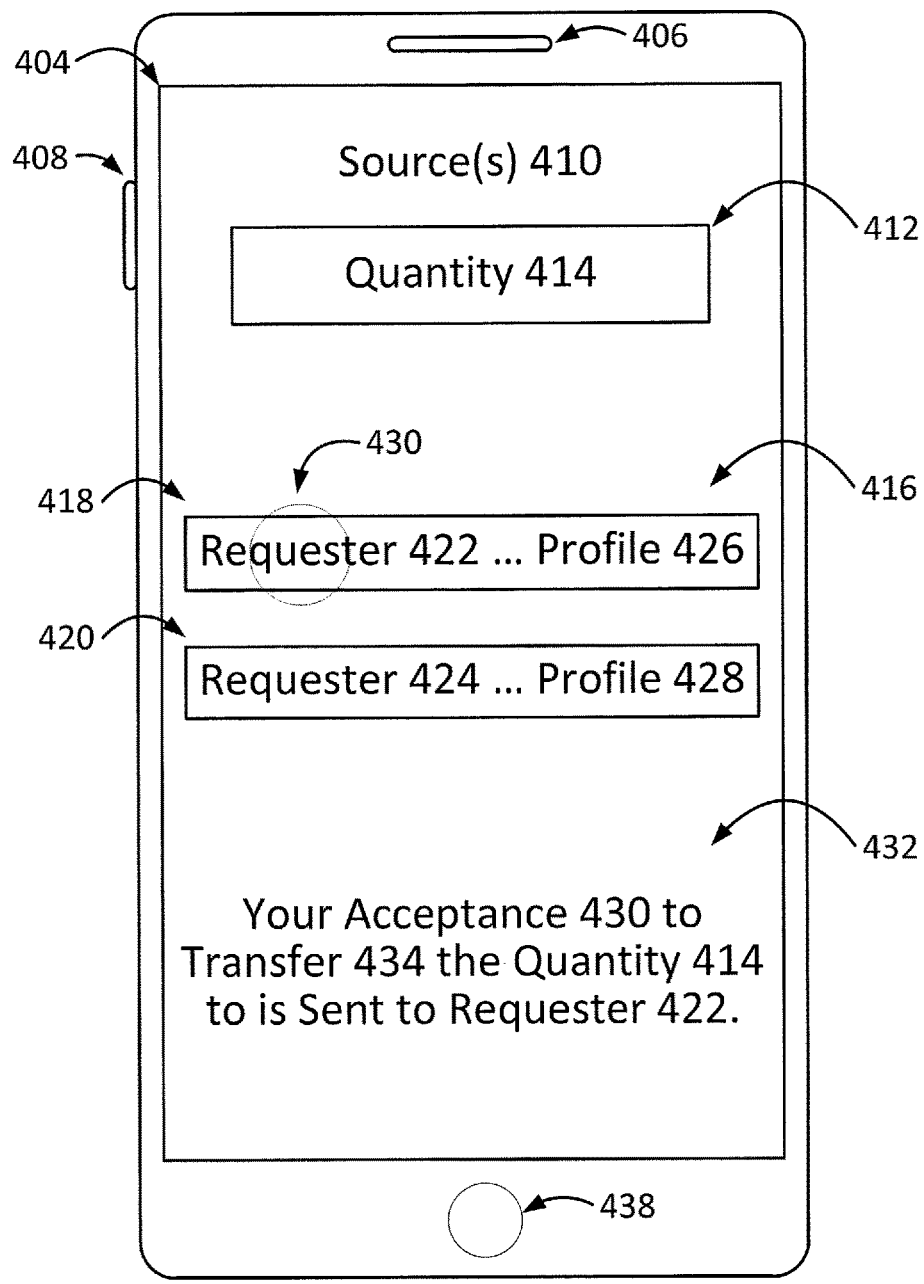
FIG. 4A illustrates an exemplary system with a client device, according to an embodiment.

FIG. 4A illustrates an exemplary system 400 with a client device 402, according to an embodiment. In some embodiments, the system 400 may take the form of the system 100 such that, for example, the client device 402 takes the form of the client device 106. Further, the system 400 may include the server system 200 described above in relation to FIGS. 2A-B. Yet further, the system 400 may include one or more server processor components that may, for example, take the form of the processor components 112 and/or 232. In addition, the system 400 may include the system 300 described above in relation to FIGS. 3A-3D.

As shown, the smartphone system 400 may include a graphical user interface 404, a microphone 406, and a button 408, among other possible hardware components. The smartphone system 400 may also include a non-transitory memory comprising instructions. The smartphone system 400 may also include one or more hardware processors that may take the form of the processor 144 described above in relation to FIG. 1. The one or more hardware processors may be coupled to the non-transitory memory and configured to read the instructions to cause the smartphone system 400 to perform operations. In some embodiments, the smartphone system 400 may perform operations to receive one or more touch inputs from the graphical user interface 404. As shown, the graphical user interface 404 may display one or more sources 410 and a quantity 414.

In some embodiments, the instructions described above may be executable to cause the smartphone system 400 to perform operations. For example, the smartphone system 400 may receive one or more inputs from a graphical user interface 404. The smartphone system 400 may also determine one or more sources 410 able to provide a quantity 414, possibly based at least on the one or more inputs received. For example, the quantity 414 may be specified by the one or more inputs received in the editable field 412. The smartphone system 400 may also determine identifiers of one or more requesters 422 and/or 424 of the quantity 414.

In some instances, the smartphone system 400 may determine profile structures 426 and/or 428 of the one or more requesters 422 and/or 424, respectively, based at least on the identifiers of the one or more requesters 422 and/or 424. As such, the smartphone system 400 may generate indications 418 and/or 420 of the profile structure 426 and/or 428, respectively, possibly to display the indications 418 and/or 420 on the graphical user interface 404.

In some embodiments, the smartphone system 400 may receive one or more second inputs 430 from the graphical user interface 404 that indicates an acceptance to transfer 434 of the quantity 414 to the one or more requesters 422. As shown, for instance, a notification 432 may indicate the acceptance 430 to transfer 434 the quantity 414 is sent to the requester 422. For example, the notification 432 may include an acceptance number that confirms the acceptance 430 to transfer 434 the quantity 414. Further, the button 438 may include a fingerprint sensor to detect a fingerprint from one or more of the requesters 410 to authenticate the acceptance 430. For example, one or more of the indications 418 and 420 may be selected while the fingerprint sensor detects a fingerprint of the source 410.

As such, the quantity 414 may be transferred to the one or more requesters 422 in a number of different ways, including electronically or physically, and/or a combination of such ways as described herein. For example, the quantity 414 may be physically transferred to the one or more requesters 422 at a location. Thus, the smartphone system 400 may cause or initiate the transfer 434 of the quantity 414 to the one or more requesters 422, possibly where the transfer 434 occurs at the location.

Figure 4B:
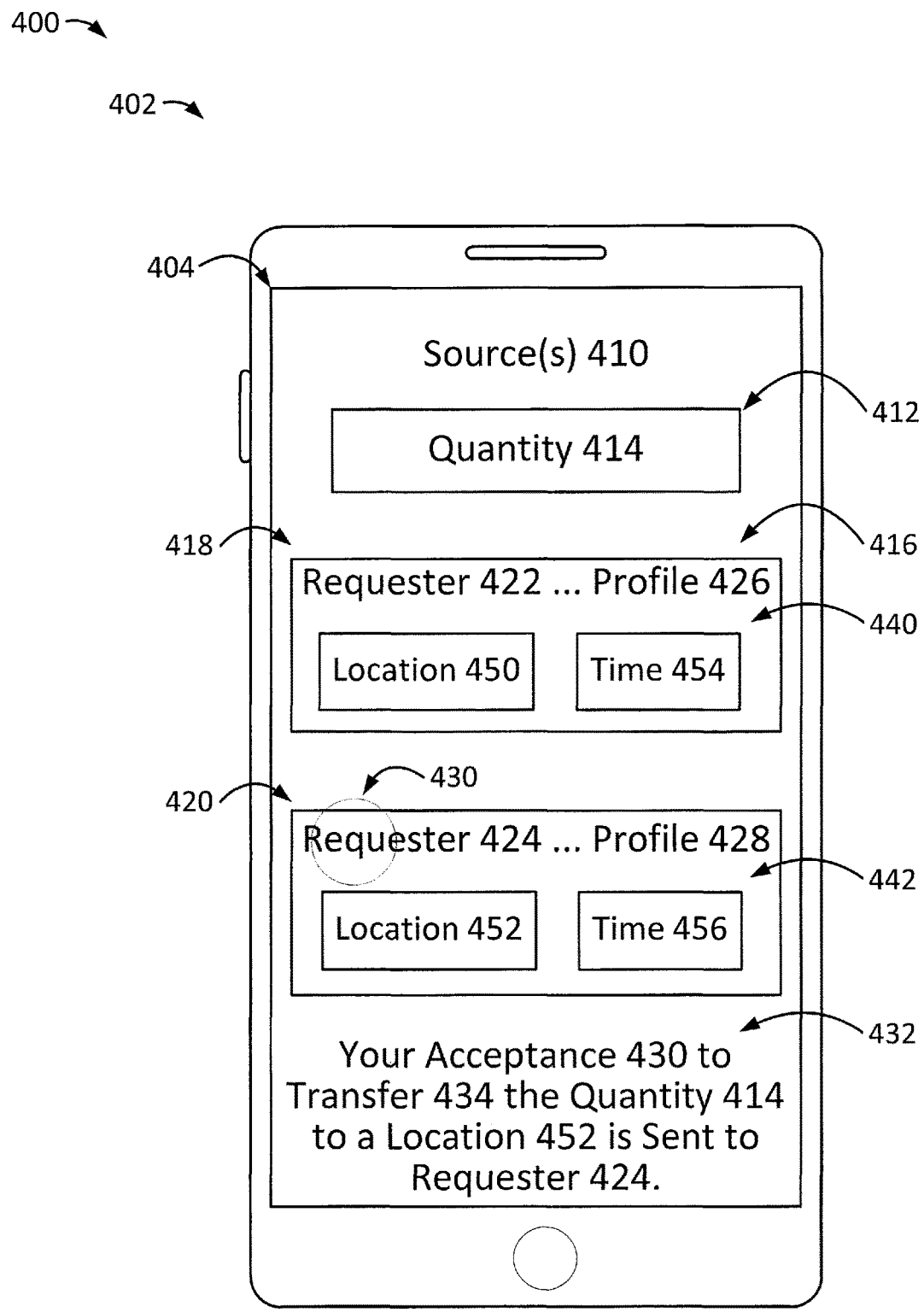
FIG. 4B illustrates an exemplary system with a client device, according to an embodiment.

FIG. 4B illustrates an exemplary system 400 with a client device 402, according to an embodiment. For example, the system 400 and the client device 402 may take the form of those in FIG. 4A. As shown, the smartphone system 400 may include the graphical user interface 404 that displays the one or more sources 410, the quantity 414 in the editable field 412, the requester 422 and the profile structure 426 in the indication 418, and the requester 424 and the profile structure 428 in the field 420. As shown, for example, the smartphone system 400 may receive one or more second inputs 430 from the graphical user interface 404 that indicates an acceptance to transfer 434 the quantity 414 to the one or more requesters 424. Further, the notification 432 may indicate the acceptance 430 to transfer 434 the quantity 414 to the location 452 is sent or transmitted to the requester 424.

In some embodiments, the identifiers of the one or more requesters 422 and/or 424 may indicate respective locations 450 and/or 452. In some instances, the respective locations 450 and/or 452 may be the locations of the requesters 422 and/or 424, respectively. Further, the respective locations 450 and/or 452 may be respective locations to transfer 434 the quantity 414 to the one or more requesters 422 and/or 424. In addition, the locations 450 and/or 452 may be identifiable by global positioning system (GPS) coordinates.

In some instances, the indications 418 and/or 420 of the profile structures 426 and/or 428 may be generated to further display options (e.g., editable fields 440 and/or 442) to modify the locations 450 and/or 452, respectively. For example, the locations 450 and/or 452 may be modified to indicate the location of the client device 402. In particular, the location 452 may indicate the location 326 as described above on the geographic map 350. In practice, for example, the source 410 may indicate that the quantity 414 is available to be transferred at the location (e.g., the location 326) of the source device 402. As such, the requester 424 may be required to physically retrieve the quantity 414 from the location (e.g., the location 326) of the source device 402.

In some embodiments, the indications 418 and/or 420 of the one or more requesters 422 and/or 424 may indicate time periods 454 and/or 456 to transfer 434 the quantity 414 to the one or more requesters 422 and/or 424, respectively. Further, the indications 418 and/or 420 of the profile structures 426 and/or 428 may be generated to further display options (e.g., editable fields 440 and/or 442) to modify the time periods 454 and/or 456, respectively. Further, the notification 432 may indicate the acceptance 430 to transfer 434 the quantity 414 to the location 452 within the time period 456. In particular, the notification 432 may indicate the acceptance 430 is sent to the requester 424.

In practice, for example, the one or more requesters 424 may indicate the time period 456 (e.g., in two hours from when the acceptance 420 is sent) to retrieve the quantity 414 from the location 452 of the one or more source 410. Referring back to FIG. 3C, for example, the one or more requesters 424 may have a two hour time period from when the acceptance 420 is sent to travel from the location 352 to the location 356 of the source 410. Further, the one or more requesters 424 may have only two hours to retrieve the quantity 414 from the location 452 before the quantity 414 is no longer available.

Figure 4C:
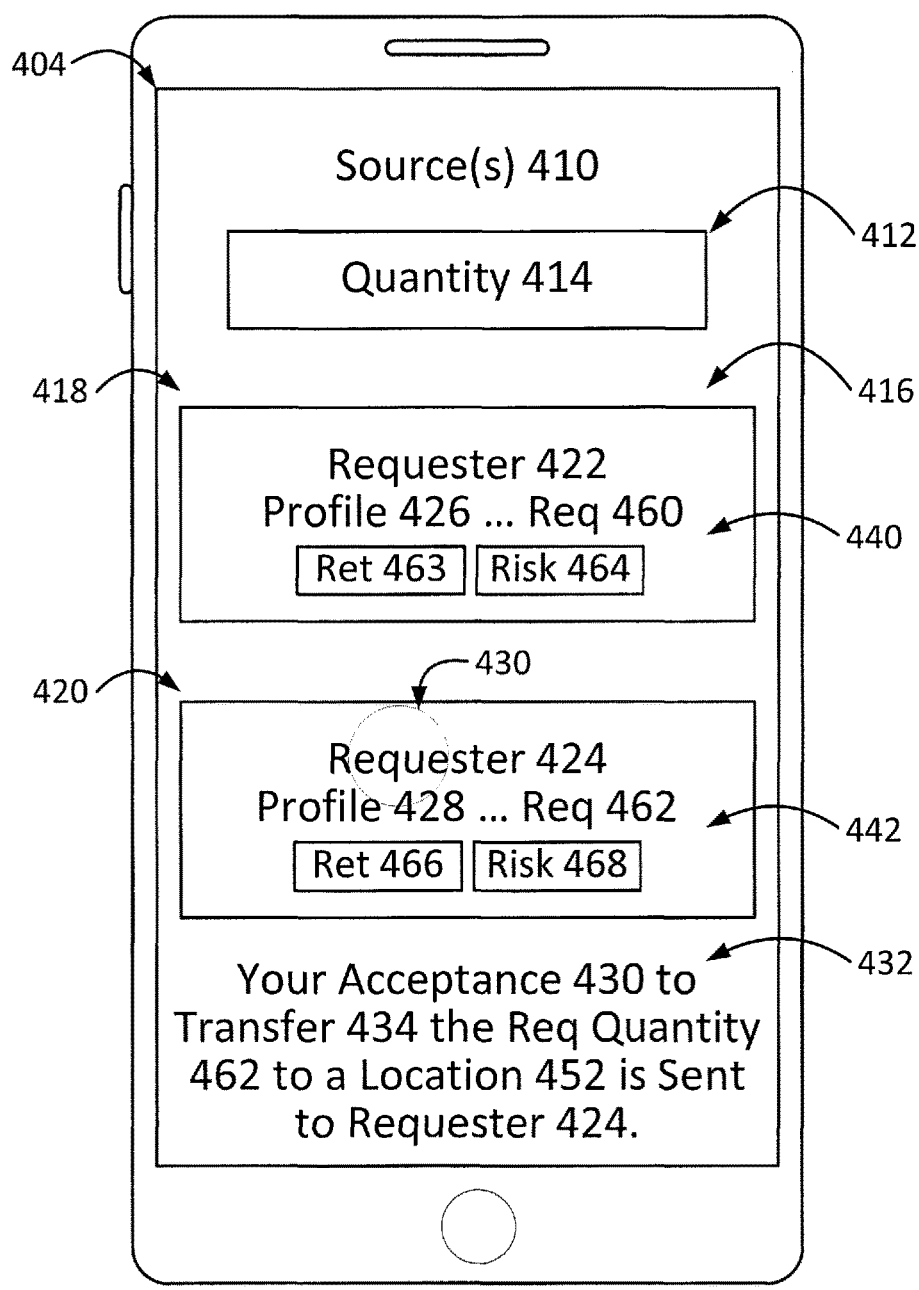
FIG. 4C illustrates an exemplary system with a client device, according to an embodiment.

FIG. 4C illustrates an exemplary system 400 with a client device 402, according to an embodiment. For example, the system 400 and the client device 402 may take the form of the client device 402 described above in relation to FIGS. 4A-B. As shown, the smartphone system 400, may include the graphical user interface 404 that displays the one or more sources 410, the quantity 414 in the editable field 412, the one or more requesters 422 and the profile structure 426 in the indication 418, and the one or more requesters 424 and the profile structure 428 in the indication 420. As also shown, for example, the smartphone system 400 may receive one or more second inputs 430 from the graphical user interface 404 that indicates an acceptance to transfer 434 the quantity 414 to the one or more requesters 424. Further, the notification 432 may indicate the acceptance 430 to transfer 434 the quantity 414 to the location 452 is sent to the requester 424.

In some embodiments, the smartphone system 400 may provide requested quantities 460 and/or 462 of the requesters 422 and/or 424, respectively. Each of the requested quantities 460 and/or 462 may be equivalent, more, or less than the quantity 414 indicated in the editable field 412. For example, in practice, the requested quantity 460 may be more than the quantity 414 available. Further, the requested quantity 462 may substantially equivalent with the quantity 414 available. As such, the source 410 may select the requester 424 and accept to transfer 434 the quantity 414 to the location 452 of the requester 424.

In some embodiments, the smartphone system 400 may determine one or more return quantities 463 and/or 466 that would be returned to the one or more sources 410 for a transfer 434 of a quantity (e.g., the quantity 414, 460, or 462) to the one or more requesters 422 and/or 424. In some instances, the one or more return quantities 463 and/or 466 may be determined based at least on the profile structure 426 and/or 428, respectively, possibly increasing or decreasing based on the number of prior quantities requested and/or the number of prior quantities returned within respective time periods. In some instances, the indications 418 and/or 420 may be generated to further include options (e.g., editable fields 440 and/or 442) to modify the return quantities 463 and/or 466.

In some instances, the smartphone system 400 may receive one or more second inputs 430 from the graphical user interface 404 that indicates an acceptance to transfer 434 the requested quantity 462 to the one or more requesters 424. Notably, the input 430 (possibly also referred to the acceptance 430) may be for the requested quantity 462, as opposed to the quantity 414 determined by the one or more sources 410 to be available for the one or more requesters 424. Further, it should be noted that the one or more sources 410 may accept to transfer 434 the requested quantity 462 based at least on the return quantity 466 that would be provided to the one or more sources 410 in return. As such, the smartphone system 400 may send a transmittal of the acceptance 430 to the one or more requesters 424. Further, the requested quantity 462 may be transferred to the one or more requesters 424 electronically, physically, and/or based on a combination of such transfer mechanisms.

In some embodiments, the return quantities 463 and/or 466 may be determined by a return rate computed. For example, the return quantities 463 and/or 466 may include the quantities requested 460 and/or 462, respectively, and further interest quantities based on possible interest rates computed by the smartphone system 400. In some instances, the return quantities 463 and/or 466 may be determined based at least on a number of prior quantities requested by the one or more requesters 422 and/or 424, respectively. Yet further, the return quantities 463 and/or 466 may be determined based on a number of quantities returned by the one or more requesters 422 and/or 422, respectively, within respective time periods associated with the prior quantities requested.

As such, the smartphone system 400 may determine a number of prior quantities requested by the one or more requesters 422 and/or 424, possibly based on account history data associated with the one or more requesters 422 and/or 424. Further, the smartphone system 400 may determine a number of prior quantities returned by the one or more requesters 422 and/or 424 within respective time periods associated with the prior quantities requested. Yet further, the indications 418 and/or 420 of the profile structure 426 and/or 428, respectively, may be generated to display the number of prior quantities requested and the number of prior quantities returned.

For example, the graphical user interface 404 may detect a given pressure of the one or more inputs 430, possibly where the pressure meets or exceeds a pressure threshold beyond a touch detected or a touch input detected. As such, based on a detection of the pressure meeting or exceeding the pressure threshold, the graphical user interface 404 may provide a history, possibly with the profiles 426 and/or 428, including the number of prior quantities returned by the one or more requesters 424 within required time periods associated with the prior quantities requested by the one or more requesters 424. As such, the one or more sources may assess whether to select the requester 424 based on the profile structure history.

Figure 4D:
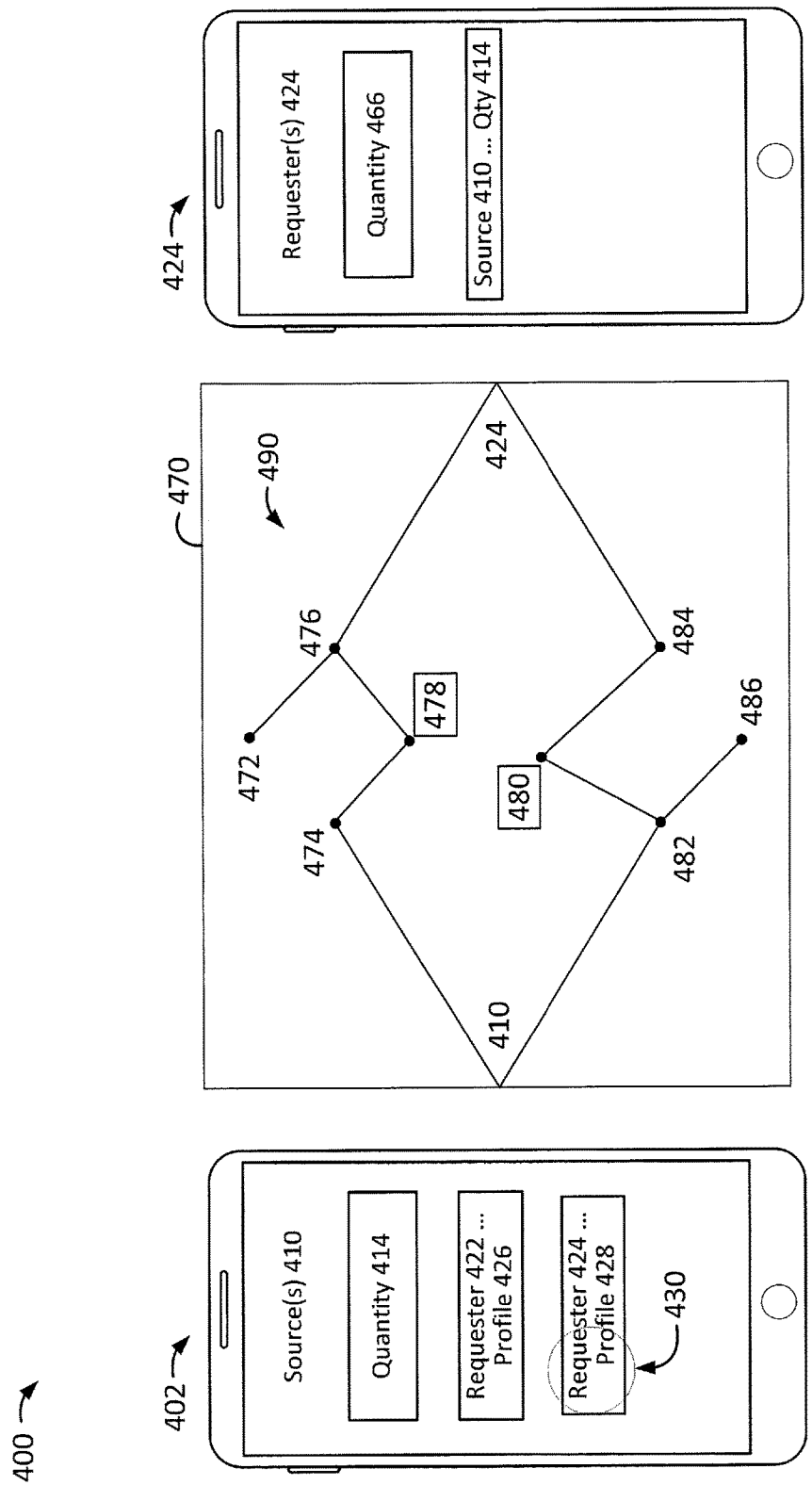
FIG. 4D illustrates an exemplary system with a number of client devices, according to an embodiment.

FIG. 4D illustrates an exemplary system 400 with a number of client devices 402 and 424, according to an embodiment. As shown, the system 400, possibly referred to as the smartphone system 400 may include the client device 402. The client device 402 may take the form of the client device 402 described above in relation to FIGS. 4A-C, possibly also referred to as the source device 402. Further, the client device 424 may take the form of the client device 302 described above in relation to FIGS. 3A-D, possibly also referred to as the requester 424 and/or the requester device 424. As shown, the client device 402 may display the one or more sources 410, the quantity 414, the requesters 422 and/or 424, and further the respective profiles 426 and/or 428. Further, as shown, the requester device 424 may display an identifier of the one or more requesters 424, the quantity 466 requested, and the one or more sources 410 able to provide the quantity 414.

As shown, the smartphone system 400 may determine a connection map 470 associated with the one or more sources 410 and the one or more requesters 424. In some instances, the one or more sources 410 and/or the source device 402 may be associated with a number of source connections 474, 478, 480, 482, and/or 486, among other possible connections. For example, the one or more sources 410 may be connected to the source connections 474, 478, 480, 482, and/or 486 through personal networks, professional networks, social media networks, and/or various other networks described above, such as the one or more networks 108. In some instances, the one or more sources 410 may share quantities and/or quantity data with the source connections 474, 478, 480, 482, and/or 486 in one or more networks described herein. Further, the one or more requesters 424 may be associated with a number of requester connections 472, 476, 478, 480, and/or 484, among other possible connections.

In some instances, the profile structure 428 indicates an intersection 490 of the number of the source connections 474, 478, 480, 482, and/or 486 and the number of requester connections 472, 476, 478, 480, and/or 484. The intersection 490 includes a number of common connections 478 and/or 480 associated with the one or more sources 410 and the one or more requesters 424. As such, the indication of the profile structure 428 may be generated to display the number of common connections 478 and/or 480 from the connection map 470. In some instances, the number of common connections 478 and/or 480 may indicate a level of confidence that the quantity 466 would be returned by the one or more requester 424. For example, increasing the number of common connections 478 and/or 480 may indicate an increased level of confidence. Notably, the graphical user interface 404 may detect a pressure of the one or more inputs 430 that meets or exceeds a pressure threshold, as described above. As such, based on a detection of the pressure meeting or exceeding the threshold, the graphical user interface 404 may provide the connection map 470, possibly with the intersection 490 and the number of common connections 478 and/or 480.

In some instances, the number of common connections 478 and/or 480 may provide a given confidence level to the source 410 with respect to the requester 424 providing the return quantity 466 within a given time period, as described above in relation to FIG. 4C. Referring back to FIG. 4C, the smartphone system 400 may determine the profile structure 426 and/or 428 of the one or more requesters 422 and/or 424. In particular, the smartphone system 400 may also determine one or more risk structures 464 and/or 468 of the one or more requesters 422 and/or 424, respectively, to reflect the confidence levels described herein. For example, the smartphone system 400 may determine one or more risk structures 464 and/or 468 based on the confidence levels and possibly associated with risks of defaulting on the return quantities 463 and/or 466.

For example, the one or more risk structures 464 and/or 468 may include risk percentages. In particular, the risk structure 464 may provide, for instance, a 20% risk that the requester 422 will not be able to return the quantity 463 to the one or more source 410 within the time period set 454. Further, the risk structure 468 may include, for instance, a 10% risk that the requester 424 will not be able to return the quantity 466 to the one or more source 410 within the time period 456. As such, the one or more sources 410 may select the requester 424, possibly with the one or more inputs 430.

As such, the one or more risk structures 464 and/or 468 may be determined based on a probability that one or more return quantities 463 and/or 466, respectively, are provided to the one or more sources 410 in return for the transfer 434 of the quantities requested 460 and/or 462 to the one or more requesters 422 and/or 424. Further, the probability may also be based on the number of prior quantities requested by the one or more requesters 422 and/or 424 and the number of prior quantities returned by the one or more requesters 422 and/or 424. As shown, for example, the indications 418 and/or 420 of the profile structure 426 and/or 428 may be generated to further display the risk structures 464 and/or 468 of the one or more requesters 422 and/or 424.

In some instances, the one or more risk structures 464 and/or 468 may be determined based further on the number of common connections 478 and/or 480 shown on the connection map 470. For example, referring to the scenario above where the risk structure 464 provides a 20% risk and the risk structure 468 provides a 10% risk. The risk structure 468 may provide a lower risk than the risk structure 464 based on the number of common connections 478 and/or 480, possibly where the number of common connections 478 and/or 480 is higher than the number of common connections between source 410 and the requester 422. For example, the requester 424 may be less likely to fail or default in providing the return quantity 466 based on the number of connections 478 and/or 480 between the source 410 and the requester 424, possibly due to the reputation of the requester 424 being affected by such a failure or default in providing the return quantity 466.

Yet, in some instances, the risk structure 468 may indicate a lower risk based on the common connections 478 and/or 480 being stronger common connections between source 410 and the requester 424. In particular, the strength of the common connections 478 and/or 480 may be determined based on the number of interactions amongst the source 410, the common connections 478 and/or 480, and/or the requester 424. In particular, the number of interactions, communications, and/or data exchanged between the source 410 and the common connections 478 and/or 480 may meet or exceed an interaction threshold to indicate the stronger connections. Further, the number of interactions, communications, and/or data exchanged between the requester 424 and the common connections 478 and/or 480 may meet or exceed an interaction threshold to indicate stronger connections, among other possibilities. Yet further, the risk structures 426 and/or 468 may be determined based on user-defined aspects, particularly if the source 410 indicates a certain trust level associated with the requester 422 and/or 424. For example, the source 410 may input indicators of trust and/or risk levels associated with the requester 422 and/or the requester 424.

Notably, the service provider may monitor whether the requester 424 provides the return quantity 466, possibly within a given time period. For example, the service provider may monitor the source account 410 to determine whether a payment is made by the requester 424. In some instances, the payment provider may inform the requester 424 that failing to provide the return quantity 466 may affect the reputation of the requester 424 based on the common connections 478 and/or 480, and/or other connections in the intersection 490. Yet, in some instances, the service provider may not monitor whether the requester 424 provides the return quantity 466. In particular, the service provider may simply pair the one or more sources 410 with the one or more requesters 424 without taking any exposure based on failures or defaults in providing the return quantity 466.

In some embodiments, the service provider may activate an application, possibly an "app" installed on a client device (e.g., the client device 302) owned or operated by the requester 424. In particular, the service provider may activate the app to alert the requester 424 that the requester 424 has not provided the return quantity 466 within the given time period. In some instances, the service provider may cause the app to provide identifications or descriptions of the common connections 478 and/or 480, possibly to urge the requester 424 to provide the return quantity 466. Further, the app may trigger a connection (e.g., a messaging connection) between the source 410 and the requester 424 such that the source 410 may request an update on the status of return quantity 466.

Figure 5A:
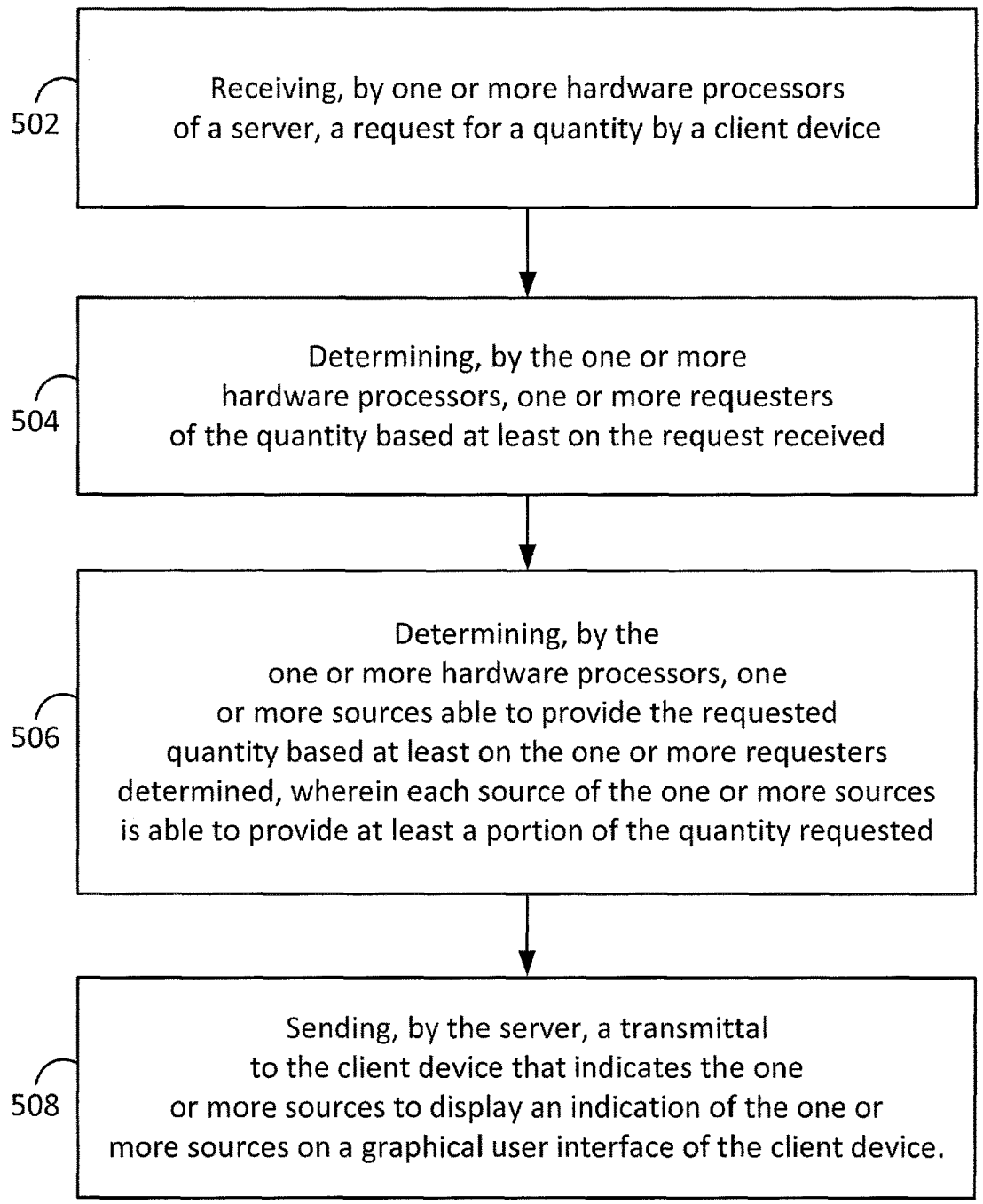
FIGS. 5A and 5B are charts of exemplary methods, respectively, according to various embodiments.
Figure 5B:
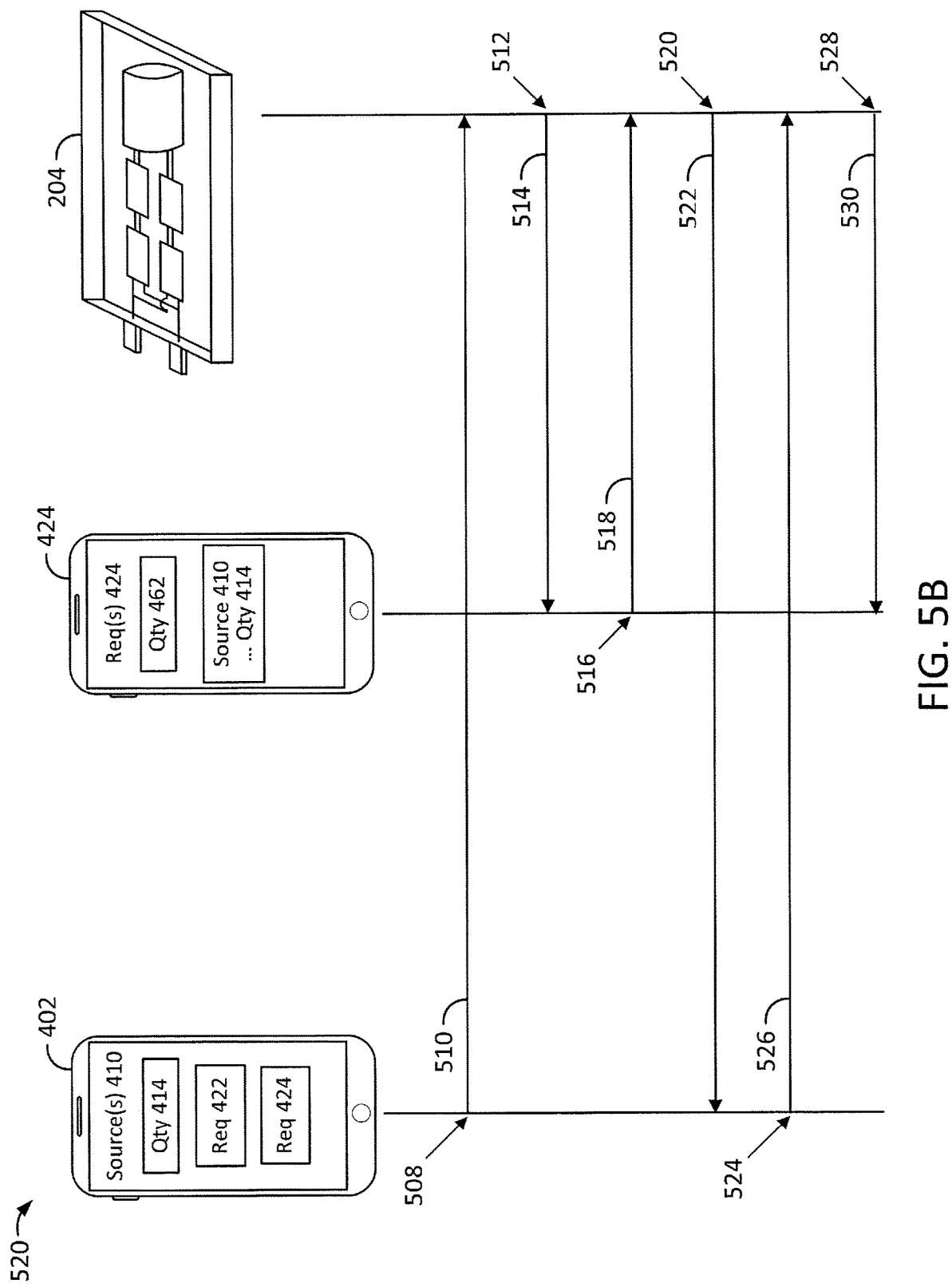

FIGS. 5A and 5B are charts of exemplary methods 500 and 520, respectively, according to various embodiments. Notably, one or more steps of the methods 500, 520, and/or other methods/processes described herein may be omitted, performed in a different sequence, and/or combined with other methods for various types of applications contemplated herein.

As shown in FIG. 5A, at step 502, the method 500 may include receiving, by one or more hardware processors of a server, a request for a quantity by a client device. For example, the method 500 may include one or more hardware processors (e.g., processors 112 and/or 232) of a server (e.g., server 102 and/or server tray 204) receiving a request in the data/data packet 122 for a quantity by a client device 104. Referring back to FIGS. 3A-3D, for example, the processor 232 may receive a request for a quantity 318 by the client device 302.

At step 504, the method 500 may include determining, by the one or more hardware processors, one or more requesters of the quantity based at least on the request received. For example, the method 500 may include the one or more hardware processors (e.g., processors 112 and/or 232) determining the one or more requesters 310 of the quantity 318 based on the request received and/or the identifier 314.

At step 506, the method 500 may include determining, by the one or more hardware processors, one or more sources able to provide the requested quantity based at least on the one or more requesters determined, where each source of the one or more sources is able to provide at least a portion of the quantity requested. For example, the method 500 may include determining, by the one or more hardware processors (e.g., processors 112 and/or 232), one or more sources 324 and/or 326 able to provide the requested quantity 318 based at least on the one or more requesters 310 determined. In particular, each source of the one or more sources 324 and/or 326 may be able to provide at least a portion of the quantity 428 requested.

At step 508, the method 500 may include sending, by the server, a transmittal to the client device that indicates the one or more sources to display an indication of the one or more sources on a graphical user interface of the client device. For example, the method 500 may include the server (e.g., server 102 and/or server tray 204) sending a transmittal to the client device 302 that indicates the one or more sources 324 and/or 326 such that the client device 302 may display the indications 320 and/or 322 on the graphical user interface 304 of the client device 302.

In some embodiments, the method 500 may include sending a transmittal to one or more networks 108 to identify sources able to provide the quantity 318. For example, the one or more networks 108 may be interconnected with a number of the sources 324, 326, and/or other sources that may able to provide the quantity 318. As such, the transmittal may include the identifier 314 of the one or more requesters 310 of the quantity 318. As such, in some instances, the sources 324, 326, and/or other sources may be able to determine respective risks associated with providing the quantity 318 to the one or more requesters 310.

As such, the method 500 may include generating a communication stream with the number of the sources 324, 326, and/or other sources over the networks 108 to identify the one or more sources 324 and/or 326 able to provide the requested quantity 314, possibly based on the respective risks associated with providing the quantity 318 to the one or more requesters 310. The method 500 may further include determining the one or more sources 324 and/or 326 able to provide the requested quantity 318 based at least on the communication stream with the number of the sources 324, 326, and/or other sources over the networks 108.

For example, the server (e.g., server 102 and/or server tray 204) may provide various forms of data to the number of sources 324, 326, and/or other sources over the networks 108. In particular, referring back to FIGS. 4C and 4D, various profiles structures (e.g., 426 and/or 428), return quantities (e.g., 463 and/or 466), risk structures (464 and/or 468), and/or connection maps (e.g., 470) may be provided to the one or more sources 324, 326, and/or other sources with respect to the one or more requesters 310. As such, the one or more sources 324 and/or 326 may assess whether to transfer the quantity 318 to the one or more requesters 310.

In some embodiments, the method 500 may include determining global positioning system (GPS) coordinates 352 associated with a transfer 338 of the quantity 318 requested. In some instances, determining the one or more sources 324 and/or 326 able to provide the requested quantity 318 may be based on the respective locations 354 and/or 356 of the one or more sources 326 and/or 324 within a threshold distance 358 from the GPS coordinates 352.

In some embodiments, the method 500 may include receiving a selection (e.g., input 334) of the one or more sources 324 and/or 326 from the client device 302. As such, the method 500 may further include the server sending a transmittal to the one or more selected sources 326 that initiates the transfer 338 of the quantity 318 from the one or more sources 326 to the client device 302. Further, the method 500 may include the server causing an autonomous vehicle to transfer the quantity 318 requested from the one or more sources 326 to the client device 302 based at least on GPS coordinates 352 of the client device 302. As such, the autonomous vehicle may transfer the quantity 318 in cash to the GPS coordinates 352 of the client device 302.

In some embodiments, the one or more requesters 310 may include the one or more requesters 424 described above in relation to FIG. 4D. As such, the one or more requesters 424 may be associated with a number of requester connections 472, 476, 478, 480, and/or 484. Further, the one or more sources 324 and/or 326 may include the one or more sources 410. As such, the one or more sources 410 may be associated with a number of source connections 474, 478, 480, 482, and/or 486. As such, determining the one or more sources 324 and/or 326 may be based on the intersection 490, possibly between the number of requester connections 472, 476, 478, 480, and/or 484 and the number of source connections 474, 478, 480, 482, and/or 486. In particular, the intersection 490 may include a number of common connections 478 and/or 480 associated with the one or more requesters 424 and the one or more sources 410.

In some embodiments, the method 500 may include determining the risk structure 464 and/or 468 for the one or more requesters 422 and/or 424 based at least on the intersection 490 of the number of common connections 478 and/or 480 associated with the one or more requesters 424 and the one or more sources 410.

FIG. 5B may include be a process chart 520 with the source device 402, the requester device 424, and the server tray 204, described above in relation to FIGS. 2B through 4D, for example. As shown in FIG. 5B, at step 508, the method 520 may include the source device 402 sending an indication 510 that the one or more sources 410 is able to provide the quantity 414. As such, the server tray 204 receives the indication 510 of the quantity 414.

In some instances, the server tray 204 searches within one or more networks (e.g., networks 108) to identify a number of requesters that may be interested in receiving the quantity 414. Yet, further the server tray 204 may search for such requesters that may have common connections with the one or more sources 410. For example, referring back to FIG. 4D, the server tray 204 may generate the connection map 470 to determine a number of common connections 478 and/or 480 associated with the one or more sources 410 and the one or more requesters 424. As such, the server tray 204 may identify the one or more requester 424.

At step 512, the server tray 204 may transmit an indication 514 of the quantity 414 to the requester device 424, among possibly other requester devices as well. In some instances, the requester device 424 may send a confirmation back to the server tray 204 that the requester 424 would like to receive the quantity 414 from the source 410. Yet, as shown, the requester device 424 may generate an indication 518 of a different quantity 462 requested by the one or more requesters 424.

At step 516, the requester device 424 may transmit the indication 518 of the requested quantity 462 to the server tray 204. As such, the server tray 204 receives the indication 518 of the requested quantity 462. The server tray 204 may determine whether the one or more sources 410 may be willing to accept the request for the quantity 462, possibly based on the difference between the requested quantity 462 and the proposed quantity 414 previously determined to be available by the one or more sources 410.

At step 520, the server tray 204 may transmit an indication 522 of the quantity 462 to the source device 402. As such, the one or more sources 410 may accept or decline the request for the quantity 462. Yet further, the one or more sources 410 may accept a different request from the one or more requesters 422, among other possibilities.

At step 524, the source device 402 may transmit an indication 526 to accept the request from the one or more requesters 424 for the requested quantity 462, possibly with additional conditions (e.g., the return quantity 466) determined by the server tray 204. As such, the server tray 204 may receive the indication 526.

At step 528, the server tray 204 may transmit the indication 530 confirming that the one or more sources 410 accepted the request for the quantity 462, possibly with additional conditions (e.g., the return quantity 466). As such, the requester device 424 may receive the indication 530 confirming that the one or more sources 410 accepted the request for the quantity 463. Yet further, the server tray 204 may instruct an autonomous drone vehicle to pick up the quantity 462 from the one or more source 410 and deliver the quantity 462 to the requester device 424.

Figure 6:
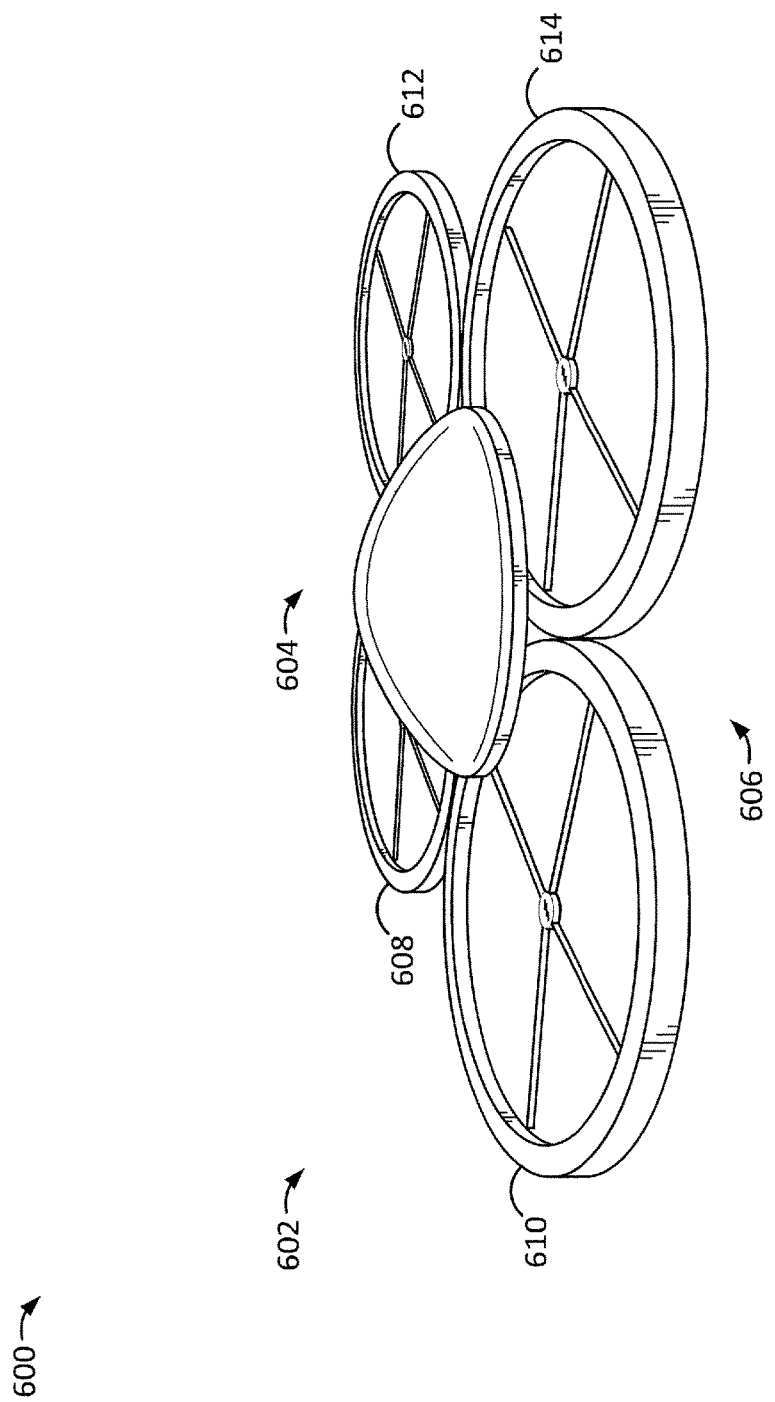
FIG. 6 illustrates an exemplary system with a client device, according to an embodiment.

FIG. 6 illustrates an exemplary system 600 with a client device 602, according to an embodiment. As shown, the client device 602 takes the form of a drone vehicle, possibly an autonomous drone vehicle referred to as the autonomous vehicle 602. As noted, for example, the method 500 described above includes the server causing the autonomous vehicle 602 to transfer the quantity 318 requested from the one or more sources 326 to the requester device 302 based at least on GPS coordinates 352 of the requester device 302. Thus, the autonomous device 602 may transfer a cash quantity 318 in a secure storage 606 from the one or more sources 326 to the GPS coordinates 352 of the requester device 302 described above.

The autonomous device 602 may include a communication system 604 configured to receive instructions from the server and transport the quantity 318 to the GPS coordinates 352. Further, the autonomous device 602 may include motors 608, 610, 612, and 614. Each of the motors 608-612 may rotate and/or propel such that the drone device 604 may be lifted off a ground surface and into the air. In some instances, the autonomous device 602 may be configured to fly above and/or within the buildings 364-368 described above in relation to FIG. 3D, and/or another setting. Further, each of the motors 608-612 may be controlled independently by navigation and altitude controls through the communication system 604. In one example, the autonomous device 604 may be controlled by another client device, such as the requester device 302, as it reaches the location 352 as shown in FIG. 3D. Notably, in such instances, the source 326 would not have to be at the location 354 to complete the transfer 338.

In some instances, the autonomous device 602 may include a camera, a video camera, a thermal camera, an infrared camera, and/or other image recording devices configured to capture an image and/or authenticate the one or more requesters 310 prior to transferring the quantity 318. Further, the drone device 604 may include sensors such as heat sensors, sound recorders such as microphones, capacitive sensors, proximity sensors, and/or other types of sensors to detect and/or record the recipient (e.g., the one or more requesters 310) of the quantity 318. As such, various forms of multimedia data may be recorded and viewed in real-time by the one or more sources 326 to ensure the proper transfer 338.

Figure 7:
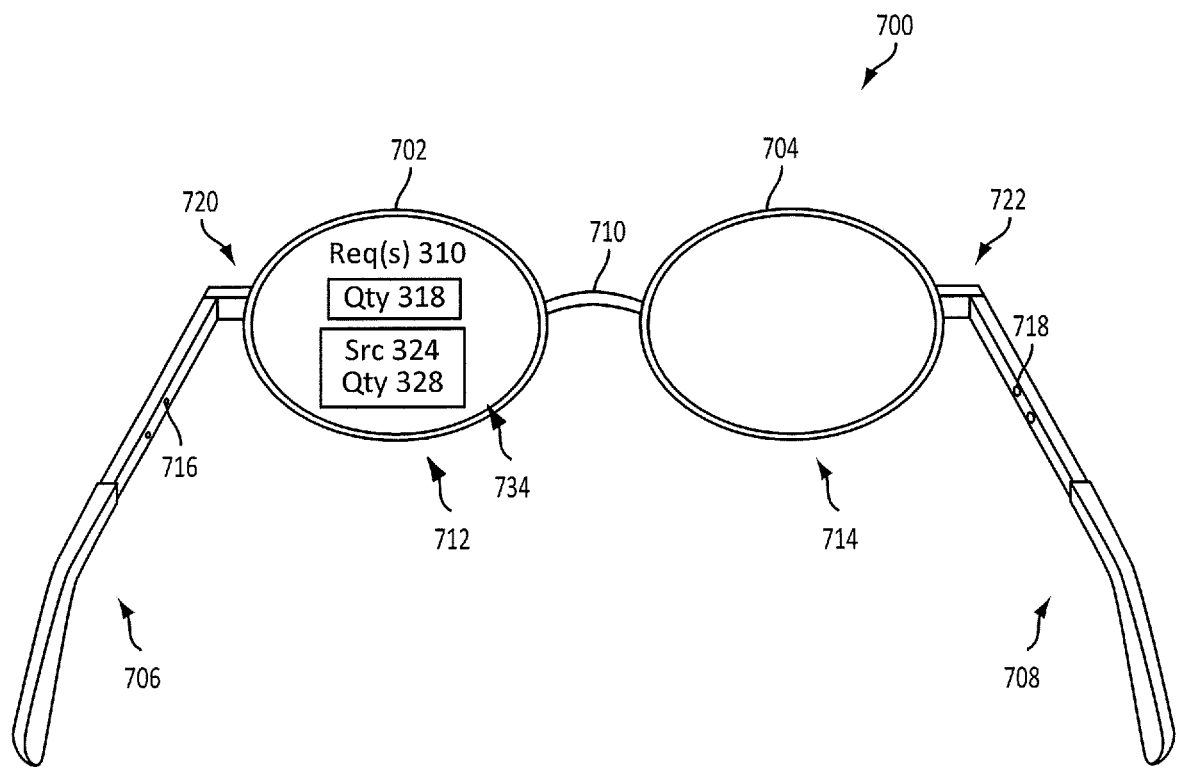
FIG. 7 illustrates an exemplary system with a client device, according to an embodiment.

FIG. 7 illustrates an exemplary wearable computing device 700, according to an embodiment. As illustrated, the wearable computing device 700 may take the form of a head-mountable display (HMD). As shown, the wearable computing device 700 may be wearable as a HMD device and/or another mountable device, e.g., a wrist-mountable device. The wearable computing device 700 may include lenses 702 and 704. The device 700 may also include a side component 706, a side component 708, and a middle component 710. For example, the device 700 may be mountable on a user's head such that the side component 706 rests on one ear of the user and the side component 708 rests on the other ear of the user. Further, the middle component 710 may rest on the nose of the user.

In some instances, the lenses 702 and 704 may be positioned in front of the user's eyes. Further, the lenses 702 and 704 may include displays 712 and 714, respectively. In some instances, the displays 712 and 714 may be transparent, partially see-through, and/or configured to provide an augmented reality. Further, the displays 712 and/or 714 may include touch pad displays. In particular, the touch pad displays may include touch sensor composed of see-through materials, such as indium tin oxide, among other possibilities. As such, the displays 712 and/or 714 may be configured to receive touch inputs and display data such that the user can manipulate graphics provided by the displays 712 and/or 714. The lenses 702 and/or 704 may also include scanners such as laser scanners configured to scan the eyes of the user to retrieve biometric inputs based on the user's eyes, retinas, and/or irises, possibly for authenticating a wearer to be an authorized user.

As shown, the display 712 may generate an indication of the one or more requesters 310, the quantity 318, and/or the source 324 along with the quantity 328. Thus, the user may select the source 324 through a verbal command or a touch input on one or more surfaces of the display 712. As such, the computing device may initiate a transmittal to the source 324, thereby instructing the source to transfer the quantity 318 to the one or more requesters 310.

The wearable computing device 700 may include one or more sensors 716 and/or 718 configured to receive a number of inputs associated with the user. The one or more sensors 716 and/or 718 may also include accelerometers, gyroscopes, compasses, barometers, capacitive sensors, haptic sensors, temperature sensors, ambient light sensors, sound sensors, image sensors, biometric sensors, moisture sensors, electrodes, and/or chemical sampling sensors, among other types of sensors to receive inputs from the user. For example, based on the way the wearable computing device 700 is worn as a head-mountable device, the sensors 716 and/or 718 may be configured to receive inputs directly and/or indirectly from the user. In some embodiments, the lens 702 may include a sensor that may, for example, include a capacitive sensor and/or proximity sensor to sense, detect, and/or identify the user of the device 700. Further, the sensor may include a biometric sensor such as a fingerprint sensor. Thus, the fingerprint sensor may receive one or more fingerprint inputs from user, possibly to view accounts of the one or more requesters 310.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

The invention claimed is:

1. A system, comprising:
   a non-transitory memory; and
   one or more hardware processors coupled to the non-transitory memory and configured to read instructions from the non-transitory memory to cause the system to perform operations comprising:
   receiving one or more first touch inputs from a graphical user interface of a device of a source;
   determining, based at least on the one or more first touch inputs, a quantity of funds to be provided by the source and an identifier of a requester of the quantity;
   simultaneously displaying, via the graphical user interface, the identifier, a location for providing the quantity of funds, and a time period for providing the quantity of funds;
   detecting, via the graphical user interface, a second touch input on the identifier;
   determining that a pressure of the second touch input exceeds a predefined threshold;
   displaying, via the graphical user interface and in response to the determining that the pressure of the second touch input exceeds the predefined threshold, a connection map that visually illustrates: one or more first connections associated with the requester but not with the source, one or more second connections associated with the source but not with the requester, and one or more third connections that is common to both the requester and the source;
analyzing the one or more third connections;
determining, based on the analyzing, a risk associated with providing the quantity to the requester and a return quantity to be provided by the requester based on the risk; and
displaying the risk with the return quantity via the graphical user interface.

2. The system of claim 1, wherein the operations further comprise:
receiving one or more third touch inputs that indicates a selection of the requester for receiving the quantity; and
transferring the quantity to the selected requester.

3. The system of claim 1, wherein the operations further comprise determining global positioning system (GPS) coordinates associated with a transfer of the quantity.

4. The system of claim 1, wherein the
simultaneously displaying further comprises displaying an identifier of the source and the quantity of funds simultaneously with the identifier of the requester, the location for providing the quantity of funds, and the time period for providing the quantity of funds.

5. The system of claim 1, wherein the operations further comprise: analyzing a social network of the source and a social network of the requester to determine the one or more first connections, second connections, and third connections.

6. The system of claim 1, wherein the operations further comprise analyzing a number of previous interactions between the requester and the source, and wherein the determining the risk is further based on the analyzing of the number of previous interactions.

7. A non-transitory machine-readable medium comprising instructions which, when executed, cause a machine to perform operations comprising:
receiving one or more first inputs from a graphical user interface of the machine;
determining, based at least on the one or more first inputs received, a quantity of funds to be provided by a source;
determining a requester for the quantity and an identifier of the requester;
simultaneously displaying, via the graphical user interface, the identifier, a location for providing the quantity of funds, and a time period for providing the quantity of funds;
detecting, via the graphical user interface, a second input on the identifier;
determining that a pressure of the second input exceeds a predefined threshold;
displaying, via the graphical user interface and in response to the determining that the pressure of the second input exceeds the predefined threshold, a connection map that visually illustrates: one or more first connections associated with the requester but not with the source, one or more second connections associated with the source but not with the requester, and one or more third connections that is common to both the requester and the source;
analyzing the one or more third connections;
determining, based on the analyzing, a risk associated with providing the quantity to the requester and a return quantity to be provided by the requester based on the risk; and
displaying the risk with the return quantity via the graphical user interface.

8. The non-transitory machine-readable medium of claim 7, wherein the operations further comprise:
receiving one or more third inputs from the graphical user interface that indicates an acceptance to transfer the quantity to the requester at a location;
sending a transmittal of the acceptance to the requester; and
causing a transfer of the quantity to the requester at the location.

9. The non-transitory machine-readable medium of claim 7, wherein the identifier of the requester indicates a location to transfer the quantity to the requester, wherein the location is identified by global positioning system (GPS) coordinates.

10. The non-transitory machine-readable medium of claim 7, wherein the simultaneously displaying further comprises displaying an identifier of the source and the quantity of funds simultaneously with the identifier of the requester, the location for providing the quantity of funds, and the time period for providing the quantity of funds.

11. The non-transitory machine-readable medium of claim 7, wherein the operations further comprise determining a profile structure of the requester at least in part by:
determining a plurality of prior quantities of funds requested by the requester; and
determining a plurality of prior quantities of funds returned by the requester within respective time periods associated with the prior quantities requested.

12. The non-transitory machine-readable medium of claim 11, wherein the determining the risk is further based on a probability that a return quantity of funds is provided to the source in return for a transfer of the quantity to the requester, wherein the probability is based at least on the plurality of prior quantities requested and the plurality of prior quantities returned.

13. The non-transitory machine-readable medium of claim 7, wherein the operations further comprise determining a confidence level of a transaction between the requester and the source based on the connection map.

14. The non-transitory machine-readable medium of claim 7, wherein the operations further comprise: analyzing a social network of the source and a social network of the requester to determine the one or more first connections, second connections, and third connections.

15. The non-transitory machine-readable medium of claim 7, wherein the operations further comprise analyzing a number of previous interactions between the requester and the source, and wherein the determining the risk is further based on the analyzing of the number of previous interactions.

16. A method, comprising:
receiving, by one or more hardware processors of a server, a request for a quantity of funds by a client device;
determining, by the one or more hardware processors, one or more requesters of the quantity based at least on the request;
determining, by the one or more hardware processors, one or more sources able to provide the quantity based at least on the one or more requesters, wherein each source of the one or more sources is able to provide at least a portion of the quantity;
causing a graphical user interface of a device of the one or more sources to simultaneously display, one or more identifiers of the one or more requesters, a location for providing the quantity of funds, and a time frame period for providing the quantity of funds;
causing the graphical user interface to display, in response to a determination that a pressure of a touch input on the one or more identifiers of the graphical user interface exceeds a predefined threshold, a graphical connection map that visually illustrates: one or more first connections associated with the one or more requesters but not with the one or more sources, one or more second connections associated with the one or more sources but not with the one or more requesters, and one or more third connections that are common connections to the one or more requesters and the one or more sources;

analyzing, by the one or more hardware processors, the one or more third connections;

determining, by the one or more hardware processors and based on the analyzing, a risk associated with providing the quantity to the one or more requesters and a return quantity to be provided by the one or more requesters based on the risk; and causing display, by the one or more hardware processors and via the graphical user interface, the risk with the return quantity to the one or more sources.

17. The method of claim 16, further comprising:

sending a transmittal to a network of a plurality of sources, wherein the transmittal comprises the one or more identifiers of the one or more requesters of the quantity, wherein the element of the graphical user interface includes the one or more identifiers; and generating a communication stream with the plurality of sources over the network to identify the one or more sources able to provide the quantity, and wherein the determining the one or more sources able to provide the quantity is based at least on the communication stream with the plurality of sources.

18. The method of claim 16, further comprising determining global positioning system (GPS) coordinates associated with a transfer of the quantity, wherein determining the one or more sources able to provide the quantity is based at least on a location of the one or more sources within a threshold distance from the GPS coordinates.

19. The method of claim 16, further comprising:

receiving a selection of the one or more sources from the client device;

sending, by the server, a transmittal to the one or more selected sources that initiates a transfer of the quantity from the one or more sources to the client device; and causing, by the server, an autonomous vehicle to transfer the quantity requested from the one or more sources to the client device based at least on GPS coordinates of the client device.

20. The method of claim 16, further comprising: analyzing a social network of the source and a social network of the requester to determine the one or more first connections, second connections, and third connections.

21. The method of claim 16, further comprising: analyzing a number of previous interactions between the one or more requesters and the one or more sources, and wherein the determining the risk is further based on the analyzing of the number of previous interactions.

22. The method of claim 21, wherein the analyzing the number of previous interactions further comprises: determining a data exchange between the one or more requesters and the one or more sources and comparing the data exchange to a predefined threshold.

* * * * *